US010870437B2

(12) United States Patent
Battles et al.

(10) Patent No.: US 10,870,437 B2
(45) Date of Patent: Dec. 22, 2020

(54) DETERMINATION OF STRATEGY MODES FOR AUTONOMOUS VEHICLE OPERATIONS

(71) Applicant: Amazon Technologies, Inc., Seattle, WA (US)

(72) Inventors: Jon Stuart Battles, North Bend, WA (US); James Christopher Curlander, Mercer Island, WA (US); Larry Felser, Bellevue, WA (US); Gur Kimchi, Bellevue, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 15/673,945

(22) Filed: Aug. 10, 2017

(65) Prior Publication Data

US 2019/0049961 A1 Feb. 14, 2019

(51) Int. Cl.
*B60W 60/00* (2020.01)
*G05D 1/00* (2006.01)
(Continued)

(52) U.S. Cl.
CPC ........ *B60W 60/0011* (2020.02); *B60W 30/00* (2013.01); *B60W 60/00274* (2020.02);
(Continued)

(58) Field of Classification Search
CPC .... G05D 1/088; G05D 1/0223; G05D 1/0287; G05D 1/0055; G05D 1/0231;
(Continued)

(56) References Cited

U.S. PATENT DOCUMENTS 7,095,318 B1 * 8/2006 Bekhor ............... B60Q 1/26
340/485
8,606,430 B2 * 12/2013 Seder et al. ........ B60Q 1/503
701/2

(Continued)

FOREIGN PATENT DOCUMENTS

DE 102014226254 A1 6/2016

OTHER PUBLICATIONS

Baber, et al, "Cooperative Autonomous Driving", IEEE Robotics Automation Magazine, Mar. 10, 2005 (Mar. 10, 2005), XP002786174, Retrieved from the Internet:URL:https://core.ac.uk/download/pdf/143860692.pdf.

(Continued)

*Primary Examiner* — Dale W Hilgendorf
(74) *Attorney, Agent, or Firm* — Athorus, PLLC

(57) ABSTRACT

Systems and methods for determining strategy modes for autonomous vehicles are described. An autonomous vehicle may detect aspects of other vehicles and aspects of the environment using one or more sensors. The autonomous vehicle may then determine strategy modes of the other vehicles, and select a strategy mode for its own operation based on the determined strategy modes and an operational goal for the autonomous vehicle. The strategy modes may include an uncoupled strategy mode, a permissive strategy mode, an assistive strategy mode, and a preventative strategy mode. The autonomous vehicle may further determine elements in the environment and topological constraints associated with the environment, and select the strategy mode for its own operation based thereon.

19 Claims, 14 Drawing Sheets

(51) Int. Cl.
*G05D 1/02* (2020.01)
*G08G 1/16* (2006.01)
*B60W 30/00* (2006.01)

(52) U.S. Cl.
CPC ......... *G05D 1/0055* (2013.01); *G05D 1/0088* (2013.01); *G05D 1/0214* (2013.01); *G05D 1/0223* (2013.01); *G05D 1/0231* (2013.01); *G05D 1/0246* (2013.01); *G05D 1/0287* (2013.01); *G08G 1/16* (2013.01); *G08G 1/161* (2013.01); *G08G 1/163* (2013.01); *G05D 2201/0213* (2013.01)

(58) Field of Classification Search
CPC .. G05D 1/0088; G05D 1/0214; G05D 1/0246; G05D 2201/0213; G08G 1/16; G08G 1/163; G08G 1/161; B60W 60/0011; B60W 60/00274; B60W 30/00
See application file for complete search history.

(56) References Cited

U.S. PATENT DOCUMENTS

| | | | |
|---|---|---|---|
| 9,234,618 B1 * | 1/2016 | Zhu et al. | G05D 1/0088 |
| 9,248,834 B1 * | 2/2016 | Ferguson et al. | G05D 1/0088 |
| 9,694,736 B2 * | 7/2017 | Williams et al. | B60Q 1/0094 |
| 10,000,152 B1 | 6/2018 | Scalea et al. | |
| 10,065,638 B1 * | 9/2018 | Wood et al. | G05D 1/0088 |
| 10,744,933 B2 * | 8/2020 | Sasaki et al. | B60Q 1/503 |
| 2009/0079839 A1 | 3/2009 | Fischer et al. | |
| 2012/0083960 A1 * | 4/2012 | Zhu et al. | G05D 1/0088 701/23 |
| 2013/0238170 A1 | 9/2013 | Klinger | |
| 2016/0221573 A1 | 8/2016 | Prokhorov | |
| 2016/0303969 A1 | 10/2016 | Akula | |
| 2017/0043784 A1 | 2/2017 | Takami | |
| 2017/0050638 A1 | 2/2017 | Gordon et al. | |
| 2017/0088038 A1 | 3/2017 | Geller | |
| 2017/0131719 A1 * | 5/2017 | Micks et al. | G05D 1/0246 |
| 2017/0158116 A1 | 6/2017 | Abbas | |
| 2017/0192429 A1 | 7/2017 | Tseng et al. | |
| 2017/0200370 A1 | 7/2017 | Miller et al. | |
| 2017/0287233 A1 | 10/2017 | Nix | |
| 2017/0308094 A1 * | 10/2017 | Abe et al. | G08G 1/161 |
| 2017/0364080 A1 | 12/2017 | Chintakindi | |
| 2018/0004223 A1 | 1/2018 | Baldwin | |
| 2018/0134286 A1 | 5/2018 | Yi et al. | |
| 2018/0154899 A1 * | 6/2018 | Tiwari et al. | G05D 1/0088 |
| 2018/0173237 A1 * | 6/2018 | Reiley et al. | G05D 1/0214 |
| 2018/0174460 A1 | 6/2018 | Jung et al. | |

OTHER PUBLICATIONS

International Search Report for International Application No. PCT/US2018/044876, dated Nov. 16, 2018.

* cited by examiner

| Strategy Mode | Other Vehicle | Autonomous Vehicle |
|---|---|---|
| Mode 1: Uncoupled 102 | Action 1 | Take Action 2 that is Uncoupled from Action 1 |
| Mode 2: Permissive 104 | Action 1 | Continue Current Action 2 to Permit Action 1 |
| Mode 3: Assistive 106 | Action 1 | Take Action 2 to Assist Action 1 |
| Mode 4: Preventative 108 | Action 1 | Take Action 2 to Prevent Action 1 |

FIG. 1

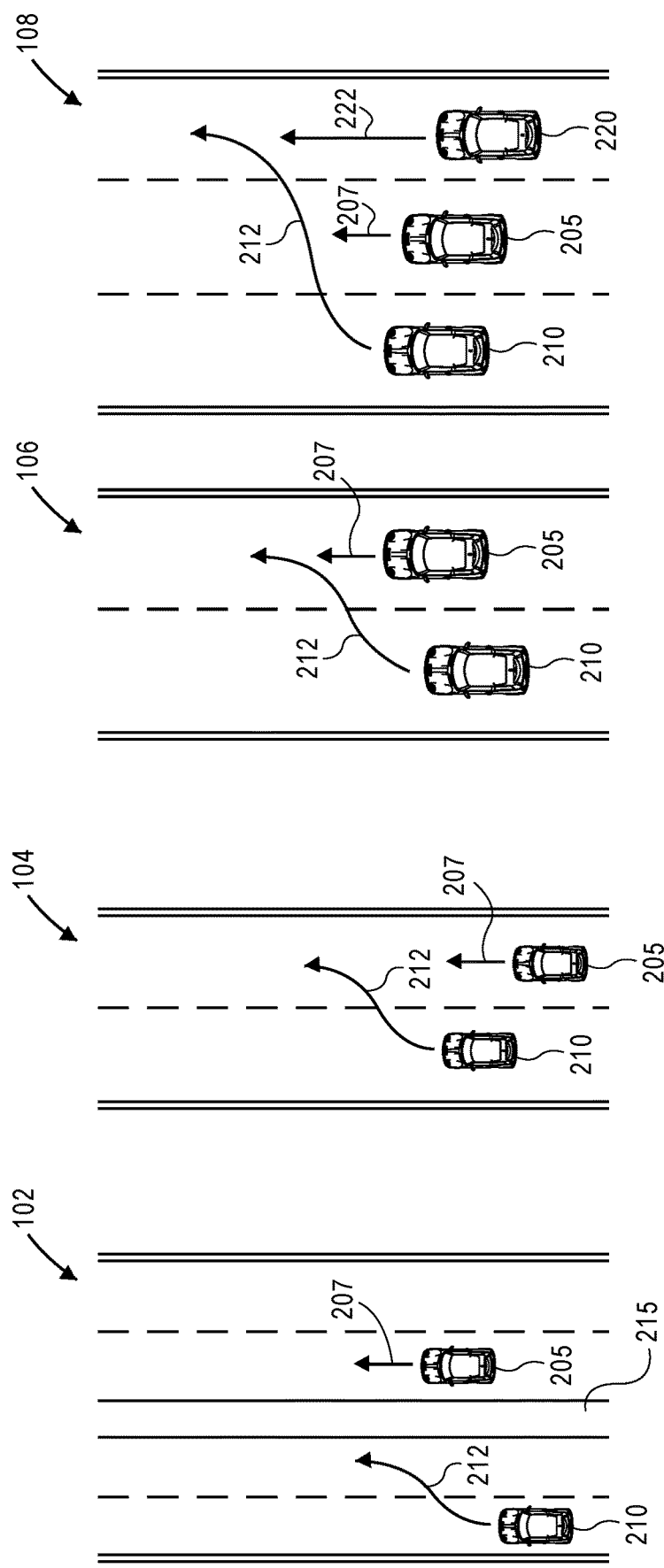

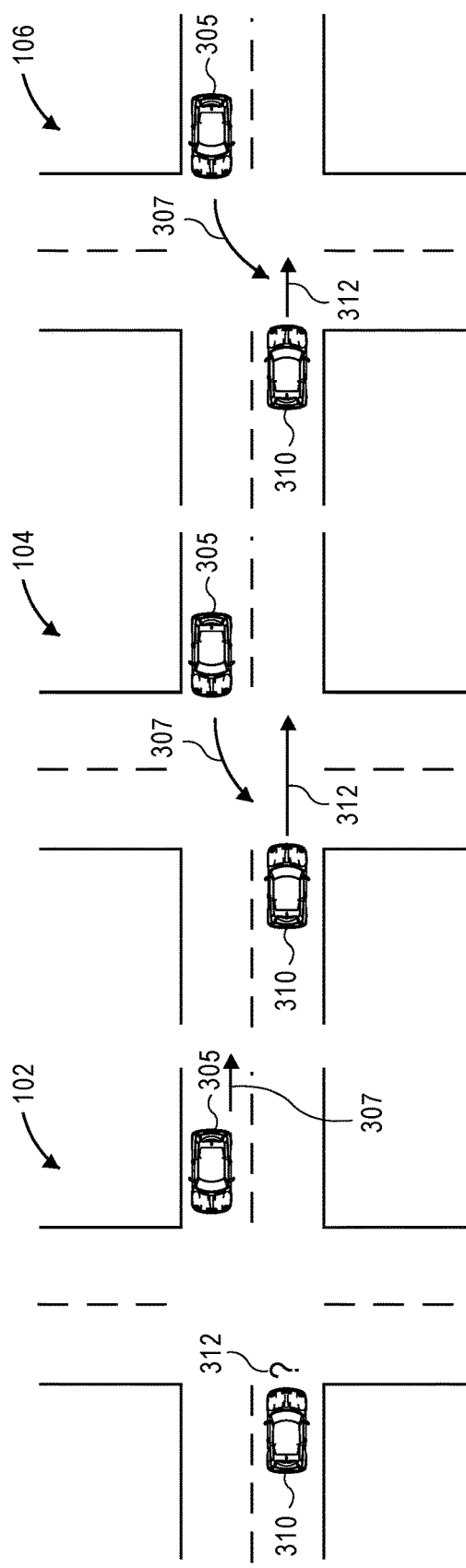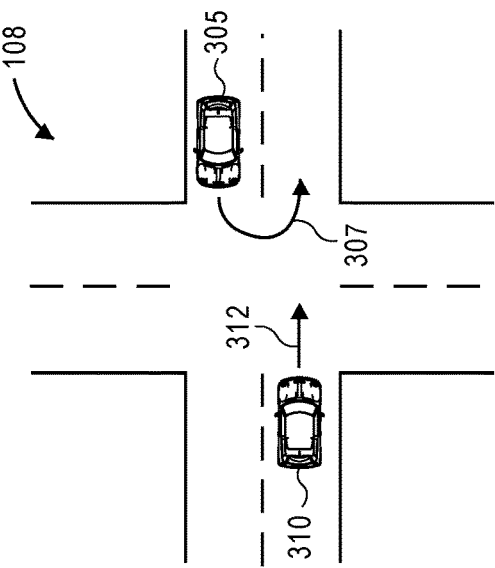

DETERMINATION OF STRATEGY MODES FOR AUTONOMOUS VEHICLE OPERATIONS

BACKGROUND

Autonomous vehicles, including ground-based vehicles and aerial vehicles, are in various stages of development. Much of the current development work focuses on the internal operations of any one autonomous vehicle and the level of autonomy associated with each individual autonomous vehicle. However, autonomous vehicles, such as autonomous cars, may be operated in environments together with other, non-autonomous vehicles, such as conventional cars operated by humans, and safety is generally regarded as the highest priority when autonomous vehicles are operated in environments where humans may be present. Accordingly, there is a need for systems and methods that enable safe, resolvable, and efficient operation of autonomous vehicles and non-autonomous vehicles in a variety of environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a table of strategy modes for autonomous vehicle operations, according to an implementation.

FIG. 2A is a schematic diagram of a first strategy mode for autonomous vehicle operations in a first example environment, according to an implementation.

FIG. 2B is a schematic diagram of a second strategy mode for autonomous vehicle operations in the first example environment, according to an implementation.

FIG. 2C is a schematic diagram of a third strategy mode for autonomous vehicle operations in the first example environment, according to an implementation.

FIG. 2D is a schematic diagram of a fourth strategy mode for autonomous vehicle operations in the first example environment, according to an implementation.

FIG. 3A is a schematic diagram of a first strategy mode for autonomous vehicle operations in a second example environment, according to an implementation.

FIG. 3B is a schematic diagram of a second strategy mode for autonomous vehicle operations in the second example environment, according to an implementation.

FIG. 3C is a schematic diagram of a third strategy mode for autonomous vehicle operations in the second example environment, according to an implementation.

FIG. 3D is a schematic diagram of a fourth strategy mode for autonomous vehicle operations in the second example environment, according to an implementation.

Figure 4A:
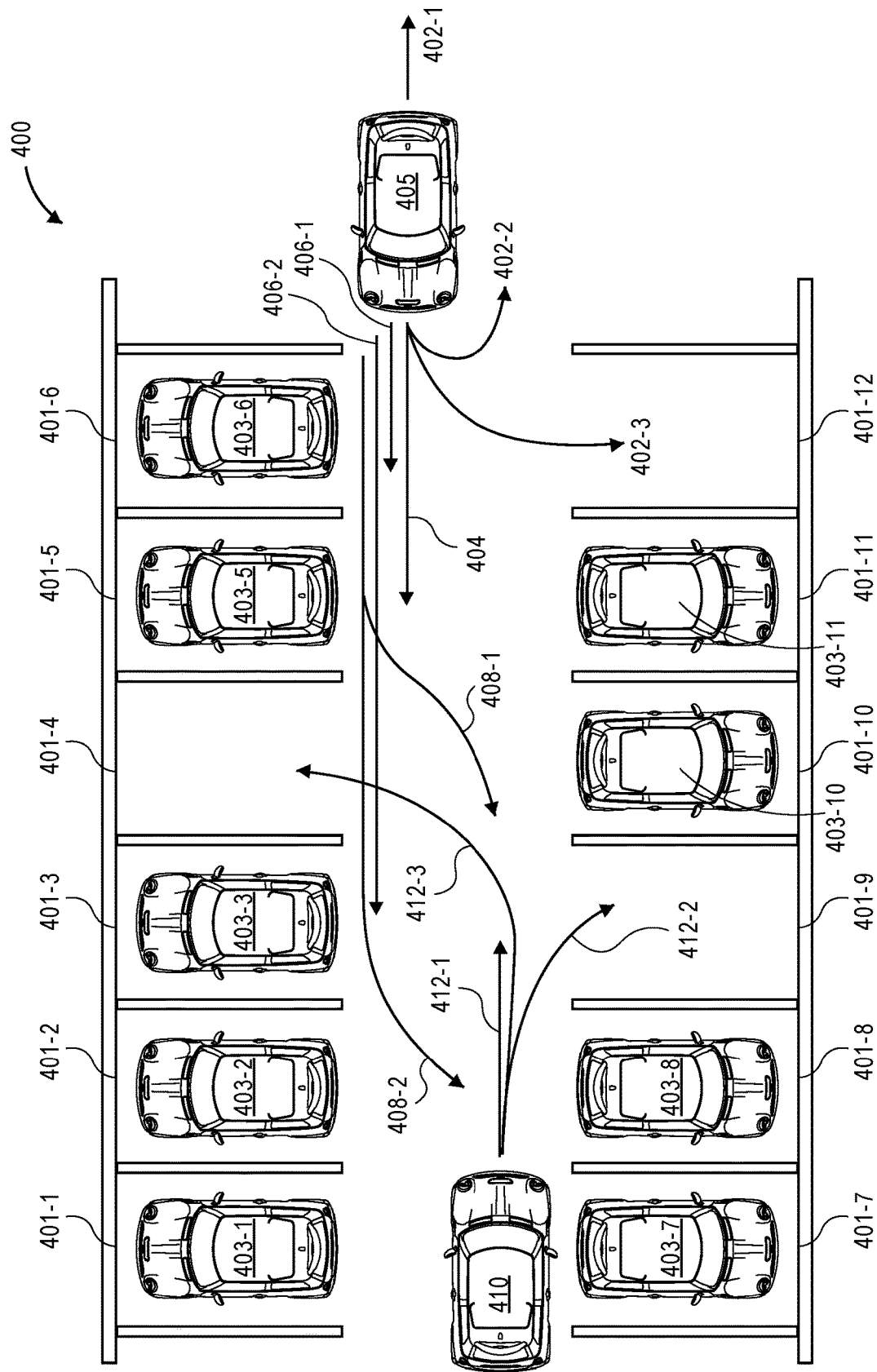
FIG. 4A is a schematic diagram of strategy modes for autonomous vehicle operations in a third example environment, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various strategy modes for autonomous vehicle operations are described herein. The strategy modes may generally relate to the interoperability of autonomous vehicles with other types of vehicles in various environments. The other types of vehicles may include other autonomous vehicles, each of which may have different levels of autonomy, other non-autonomous vehicles, such as vehicles operated by humans, other types of autonomous or non-autonomous vehicles, such as automobiles, other ground-based vehicles, air-based vehicles, water-based vehicles, space-based vehicles, automated guided vehicles, or other robotic vehicles or systems, or any other types of vehicles or systems that may be operated in environments together with autonomous vehicles.

The strategy modes for autonomous vehicle operations may include four general strategy modes, including an uncoupled strategy mode, a permissive strategy mode, an assistive strategy mode, and a preventative strategy mode.

When operating in an uncoupled strategy mode, an autonomous vehicle may select actions that may not affect or be affected by a strategy mode and/or action of a second vehicle. For example, if the autonomous vehicle and the second vehicle are facing each other at an intersection having a four-way stop sign, and if the strategy mode and/or action of the second vehicle is unknown or cannot be determined, the autonomous vehicle may choose an uncoupled strategy mode that may not affect or be affected by the second vehicle. Corresponding uncoupled actions of the autonomous vehicle may include waiting for the second vehicle to take an action, reversing in the direction from which the autonomous vehicle arrived at the intersection, or performing a U-turn and returning back to the direction from which the autonomous vehicle arrived at the intersection.

When operating in a permissive, or coupled, strategy mode, an autonomous vehicle may continue actions that permit or allow a strategy mode and/or action of a second vehicle to be successfully performed without requiring a change to current actions of the autonomous vehicle. For example, if the autonomous vehicle and the second vehicle are facing each other at an intersection having a four-way stop sign, and the autonomous vehicle detects the strategy mode and/or action of the second vehicle as performing a left turn operation, the autonomous vehicle may choose a permissive strategy mode to continue current actions without change. Corresponding permissive actions of the autonomous vehicle may include continuing to wait until the second vehicle completes its left turn, continuing a forward motion at a slower speed so that the second vehicle completes its left turn before the autonomous vehicle enters the intersection, or continuing a forward motion at a higher speed through the intersection before the second vehicle begins its left turn.

When operating in an assistive strategy mode, an autonomous vehicle may select actions that facilitate a strategy mode and/or action of a second vehicle in being successfully performed by causing a change to current actions of the autonomous vehicle. For example, if the autonomous vehicle and the second vehicle are facing each other at an intersection having a four-way stop sign, and the autonomous vehicle detects the strategy mode and/or action of the second vehicle as performing a left turn operation, the autonomous vehicle may choose an assistive strategy mode to alter current actions of the autonomous vehicle. Corresponding assistive actions of the autonomous vehicle may include stopping and waiting until the second vehicle completes its left turn, decelerating until the second vehicle completes its left turn, or accelerating past the second vehicle before the second vehicle begins its left turn.

When operating in a preventative strategy mode, an autonomous vehicle may select actions that prevent a strategy mode and/or action of a second vehicle from being successfully performed by causing a change to current actions of the autonomous vehicle. For example, if the autonomous vehicle and the second vehicle are facing each other at an intersection having a four-way stop sign, and the autonomous vehicle detects the strategy mode and/or action of the second vehicle as performing a left turn operation which may be an unsafe or otherwise undesirable operation (e.g., due to an accident, construction, traffic congestion, or other incident in that direction), the autonomous vehicle may choose a preventative strategy mode to alter current actions of the autonomous vehicle. Corresponding preventative actions of the autonomous vehicle may include blocking the roadway that leads to the accident, construction, traffic congestion, or other incident, or blocking the second vehicle to prevent its left turn.

An autonomous vehicle may select a particular strategy mode based on a variety of information related to the autonomous vehicle itself, other vehicles, and/or the environment. In one embodiment, the autonomous vehicle may not detect any information about other vehicles and/or the environment and may select a strategy mode based on its intended operation. In some embodiments, the autonomous vehicle may detect information about other vehicles and their strategy modes and/or actions and may select a strategy mode based on such information. In other embodiments, the autonomous vehicle may detect information about the environment, as well as other vehicles and their strategy modes and/or actions, and may select a strategy mode based on such information.

In addition, an autonomous vehicle may select a particular strategy mode based on one or more operational goals of the autonomous vehicle. For example, if an autonomous vehicle prioritizes on-time arrival at a particular destination by a particular time, one or more strategy modes and/or corresponding actions may be selected by the autonomous vehicle to facilitate its arrival at the destination by the designated time. Further, if an autonomous vehicle prioritizes safe operation in all situations, one or more strategy modes and/or corresponding actions may be selected by the autonomous vehicle to maximize safety at all times. In this manner, an autonomous vehicle may prioritize any one or more of various operational goals at various times during its operation, and select strategy modes and/or actions that allow the autonomous vehicle to achieve its operational goals.

Each of the strategy modes may include a corresponding set of available actions that may be taken by the autonomous vehicle. The set of available actions may vary based on the detected information related to the autonomous vehicle itself, other vehicles, and/or the environment. For example, if an autonomous vehicle has a minimum turning radius, the autonomous vehicle may not be able to select a U-turn action in environments in which the minimum turning radius is too large to execute a successful U-turn action. In addition, if a second vehicle is blocking one possible path of the autonomous vehicle, the autonomous vehicle may not be able to select an action to proceed along that path until the second vehicle is no longer blocking that path. Further, if a traffic signal indicates a red light, or if a pedestrian is crossing in front of the autonomous vehicle, an autonomous vehicle may not be able to select an action to proceed forward until the traffic signal indicates a green light, or until the pedestrian has completely crossed in front of the autonomous vehicle.

An autonomous vehicle management system may receive information from a plurality of vehicles, including autonomous vehicles and non-autonomous vehicles. The information may include strategy modes of the vehicles, actions of the vehicles, aspects of various environments, and topological constraints of various environments. The autonomous vehicle management system may process the received information and perform optimizations of autonomous vehicle operations in accordance with one or more operational goals of the system as a whole. The autonomous vehicle management system may alter or modify the operations of one or more autonomous vehicles to meet one or more operational goals. For example, to minimize the time to arrival of an emergency vehicle to the scene of an accident, the autonomous vehicle management system may modify operations or routing of other autonomous vehicles to facilitate access to the scene by the emergency vehicle. Further, to evenly distribute the load of vehicles throughout a road network, the autonomous vehicle management system may modify operations or routing of one or more autonomous vehicles to facilitate substantially evenly distributed usage of the road network by all vehicles. Accordingly, an autonomous vehicle management system may optimize for any one or more of various operational goals at various times.

Each autonomous vehicle may broadcast or share its strategy mode, and other information, with other vehicles. To accomplish this, each autonomous vehicle may include a broadcasting or notification device that broadcasts or transmits its strategy mode to other vehicles. The broadcasting or notification device may comprise a visual notification device, such as one or more lights or a visual identifier, an audio notification device, such as one or more speakers that emit sounds, or a signal notification device, such as one or more transponders or electromagnetic or radiofrequency transmitters that emit electromagnetic or radiofrequency signals, respectively.

In addition, each autonomous vehicle may also detect strategy modes, and other information, of other vehicles. To accomplish this, each autonomous vehicle may include a sensing device that detects or receives strategy modes from other vehicles. The sensing device may comprise a visual sensing device, such as one or more imaging devices, an audio sensing device, such as one or more microphones, or a signal detection/receiving device, such as one or more electromagnetic signal receivers or radiofrequency identification readers. Moreover, each vehicle may also include other sensors to detect aspects of the environment, and/or to detect or monitor internal operations, capabilities, and functions of the vehicle itself.

Furthermore, the broadcasting/notification devices and/or the sensing devices may be separate or combined units or systems that may be installed, used, or retrofitted in other vehicles, e.g., non-autonomous vehicles operated by humans, or various types of autonomous vehicles. By the incorporation of such systems into non-autonomous vehicles, drivers of non-autonomous vehicles may be able to selectively broadcast their strategy modes and/or actions to other vehicles, drivers of non-autonomous vehicles may also be alerted to the strategy modes and/or actions of other vehicles, and/or autonomous vehicles may be able to detect strategy modes and/or actions of non-autonomous vehicles.

FIG. 1 is a table 100 of strategy modes for autonomous vehicle operations, according to an implementation. In the first column, the table 100 identifies the four strategy modes for autonomous vehicle operations, including an uncoupled strategy mode 102, a permissive strategy mode 104, an assistive strategy mode 106, and a preventative strategy mode 108. In the second column, the table 100 identifies a detected action of a second or other vehicle. The second or other vehicle may be an autonomous vehicle, a non-autonomous vehicle, a different type of autonomous vehicle, or any other autonomous or non-autonomous vehicle or system.

In the third column, the table 100 identifies a corresponding type of action that the autonomous vehicle may perform based on the selected strategy mode 102, 104, 106, 108. For example, when operating in the uncoupled strategy mode 102, an autonomous vehicle may select an action that is uncoupled from any action by the other vehicle. The uncoupled action of the autonomous vehicle may not affect or be affected by any action by the other vehicle. When operating in the permissive strategy mode 104, an autonomous vehicle may determine to continue a current action without change to permit or allow an action by the other vehicle. The permissive action, e.g., the continued current action without change, may be determined to be consistent or compatible with the action by the other vehicle. When operating in the assistive strategy mode 106, an autonomous vehicle may select an action that will assist an action by the other vehicle. The assistive action may be required by the autonomous vehicle in order to facilitate the successful performance of the action by the other vehicle. When operating in the preventative strategy mode 108, an autonomous vehicle may select an action that will prevent an action by the other vehicle. The preventative action may be determined by the autonomous vehicle to be desirable or necessary to prevent the action by the other vehicle.

An autonomous vehicle may select from among the four strategy modes based on any amount of detected or received information. In one embodiment, the autonomous vehicle may select a strategy mode without detection, receipt, processing, or analysis of any information about other vehicles or the environment. In some embodiments, the autonomous vehicle may select a strategy mode based on detected or received information about other vehicles and their strategy modes and/or actions. In other embodiments, the autonomous vehicle may select a strategy mode based on detected or received information about the environment, as well as other vehicles and their strategy modes and/or actions. In still further embodiments, the autonomous vehicle may select a strategy mode based on detected or determined topological constraints associated with the environment.

For example, during the performance of any action and/or during a transition between two or more actions associated with a selected strategy mode, the autonomous vehicle may continually detect or receive information about other vehicles and/or the environment. During such transition stages, the autonomous vehicle may continue to update its selection of a strategy mode based on the detected or received information. For example, other vehicles may alter their strategy modes and/or actions, such that the autonomous vehicle may then update its strategy mode and/or actions based on such detected changes. In addition, detected or determined topological constraints may be utilized by the autonomous vehicle to select from among available actions associated with the selected strategy mode. For example, if an autonomous vehicle has a particular threshold topological number at or above which it seeks to operate, the autonomous vehicle may select an action from the available set of actions based on the detected or determined topological constraints, as well as predicted topological constraints associated with selecting and performing an action, in order to maintain its operation within the environment at or above the threshold topological number during the performance of the action and/or during transitions between two or more actions. Moreover, such topological constraints may change over time, e.g., from an initial state before performing an action, during a transition state while performing the action, and upon reaching a final state after completing the action, as the autonomous vehicle moves within the environment and/or as other vehicles move or alter their actions within the environment.

FIGS. 2A, 2B, 2C, and 2D are schematic diagrams of the four strategy modes 102, 104, 106, 108 for autonomous vehicle operations in a first example environment, according to an implementation. The first example environment includes a roadway or highway having multiple lanes intended for travel in the same direction by autonomous and non-autonomous vehicles.

FIG. 2A includes an autonomous vehicle 205 with an intended travel 207 and a second vehicle 210 with an intended travel 212, in which the autonomous vehicle 205 may select an uncoupled strategy mode 102. The second vehicle 210 may be an autonomous or non-autonomous vehicle. In addition, FIG. 2A includes a barrier or divider 215 between two sets of lanes of the roadway. As shown in FIG. 2A, the autonomous vehicle 205 may detect the second vehicle 210 and its strategy mode and/or actions. For example, the autonomous vehicle 205 may detect the intended travel 212 of the second vehicle 210 as it begins to change lanes. However, because of the presence of the divider 215 between the set of lanes on which the second vehicle 210 is traveling and the set of lanes on which the autonomous vehicle 205 is traveling, the autonomous vehicle 205 may select an uncoupled strategy mode and any corresponding action that does not affect or is not affected by the second vehicle 210.

Referring to FIG. 2A, the set of available actions for the uncoupled strategy mode of the autonomous vehicle 205 may include accelerating, maintaining a current speed, decelerating, stopping, changing lanes, and/or combinations thereof because of the uncoupled status of the operations of the second vehicle 210 and the operations of the autonomous vehicle 205.

FIG. 2B includes an autonomous vehicle 205 with an intended travel 207 and a second vehicle 210 with an intended travel 212, in which the autonomous vehicle 205 may select a permissive strategy mode 104. The second vehicle 210 may be an autonomous or non-autonomous vehicle traveling at a higher speed than the autonomous vehicle 205. As shown in FIG. 2B, the autonomous vehicle 205 may detect the second vehicle 210 and its strategy mode and/or actions. For example, the autonomous vehicle 205 may detect the intended travel 212 of the second vehicle 210 as it passes the autonomous vehicle 205 and begins to change lanes. Because the autonomous vehicle 205 is traveling at a slower speed than that of the second vehicle 210, the autonomous vehicle 205 may select a permissive strategy mode and continue its current actions so as to permit the operations by the second vehicle 210.

Referring to FIG. 2B, the set of available actions for the permissive strategy mode of the autonomous vehicle 205 may include maintaining a current speed, direction, and/or lane so as to permit or allow the operations of the second vehicle 210 without change to the operations of the autonomous vehicle 205.

FIG. 2C includes an autonomous vehicle 205 with an intended travel 207 and a second vehicle 210 with an intended travel 212, in which the autonomous vehicle 205 may select an assistive strategy mode 106. The second vehicle 210 may be an autonomous or non-autonomous vehicle traveling at a similar speed as the autonomous vehicle 205. As shown in FIG. 2C, the autonomous vehicle 205 may detect the second vehicle 210 and its strategy mode and/or actions. For example, the autonomous vehicle 205 may detect the intended travel 212 of the second vehicle 210 as it travels next to the autonomous vehicle 205 and begins to change lanes. Because the autonomous vehicle 205 is traveling at a similar speed as the second vehicle 210 and may recognize a conflict between the operations of the second vehicle 210 and its own operations, the autonomous vehicle 205 may select an assistive strategy mode to facilitate the operations by the second vehicle 210.

Referring to FIG. 2C, the set of available actions for the assistive strategy mode of the autonomous vehicle 205 may include accelerating to allow the second vehicle to change lanes, decelerating to allow the second vehicle to change lanes, stopping, flashing lights, emitting audible noises, moving over to the shoulder of the roadway, and/or combinations thereof so as to facilitate the operations of the second vehicle 210 by changing the operations of the autonomous vehicle 205.

FIG. 2D includes an autonomous vehicle 205 with an intended travel 207, a second vehicle 210 with an intended travel 212, and a third vehicle 220 with an intended travel 222, in which the autonomous vehicle 205 may select a preventative strategy mode 108. The second vehicle 210 may be an autonomous or non-autonomous vehicle traveling at a higher speed than the autonomous vehicle 205, and the third vehicle 220 may also be an autonomous or non-autonomous vehicle traveling at a higher speed than the autonomous vehicle 205. As shown in FIG. 2D, the autonomous vehicle 205 may detect the second vehicle 210 and its strategy mode and/or actions, and the autonomous vehicle 205 may also detect the third vehicle 220 and its strategy mode and/or actions. For example, the autonomous vehicle 205 may detect the intended travel 212 of the second vehicle 210 as it travels next to the autonomous vehicle 205 and begins to change lanes, and the autonomous vehicle 205 may also detect the intended travel 222 of the third vehicle 220 as it travels next to the autonomous vehicle 205. Because the autonomous vehicle 205 may recognize a conflict between the operations of the second vehicle 210 and the third vehicle 220, the autonomous vehicle 205 may select a preventative strategy mode to prevent the operations by the second vehicle 210 and/or the third vehicle 220.

Referring to FIG. 2D, the set of available actions for the preventative strategy mode of the autonomous vehicle 205 may include accelerating to prevent the second vehicle from changing lanes, changing lanes to prevent the third vehicle from passing, flashing lights, emitting audible noises, and/or combinations thereof so as to prevent the operations of the second vehicle 210 and/or the third vehicle 220 by changing the operations of the autonomous vehicle 205.

FIGS. 3A, 3B, 3C, and 3D are schematic diagrams of the four strategy modes 102, 104, 106, 108 for autonomous vehicle operations in a second example environment, according to an implementation. The second example environment includes a four-way intersection in which autonomous and non-autonomous vehicles may approach from or depart towards any of the four directions of the intersection.

FIG. 3A includes an autonomous vehicle 305 with an intended travel 307 and a second vehicle 310 with an intended travel 312, in which the autonomous vehicle 305 may select an uncoupled strategy mode 102. The second vehicle 310 may be an autonomous or non-autonomous vehicle. As shown in FIG. 3A, the autonomous vehicle 305 may not be able to detect the strategy mode and/or actions of the second vehicle 310. For example, the second vehicle 310 may be stopped at the four-way intersection and may not be broadcasting or transmitting its strategy mode or any other information. As a result, the autonomous vehicle 305 may select an uncoupled strategy mode and any corresponding action that does not affect or is not affected by the second vehicle 310. One example action that the autonomous vehicle 305 may take is shown as the intended travel 307, in which the autonomous vehicle 305 reverses and returns to the direction from which it approached the intersection.

Referring to FIG. 3A, the set of available actions for the uncoupled strategy mode of the autonomous vehicle 305 may include stopping and waiting for the second vehicle 310 to move and/or broadcast its strategy mode and/or actions, flashing lights, emitting audible noises, reversing back in the direction from which the autonomous vehicle 305 approached the intersection, making a U-turn and returning to the direction from which the autonomous vehicle 305 approached the intersection, making a right turn and moving away from the second vehicle 310, and/or combinations thereof in accordance with the selection of the uncoupled strategy mode for the operations of the autonomous vehicle 305.

FIG. 3B includes an autonomous vehicle 305 with an intended travel 307 and a second vehicle 310 with an intended travel 312, in which the autonomous vehicle 305 may select a permissive strategy mode 104. The second vehicle 310 may be an autonomous or non-autonomous vehicle traveling at a higher speed than the autonomous vehicle 305. As shown in FIG. 3B, the autonomous vehicle 305 may detect the second vehicle 310 and its strategy mode and/or actions. For example, the autonomous vehicle 305 may detect the intended travel 312 of the second vehicle 310 as it passes by the autonomous vehicle 305. Because the autonomous vehicle 305 is traveling at a slower speed than that of the second vehicle 310, the autonomous vehicle 305 may select a permissive strategy mode and continue its current actions so as to permit the operations by the second vehicle 310.

Referring to FIG. 3B, the set of available actions for the permissive strategy mode of the autonomous vehicle 305 may include continuing to stop and wait until the second vehicle 310 passes by the autonomous vehicle 305, continuing to slowly make a left turn through the intersection such that the second vehicle 310 passes by the autonomous vehicle 305 before the autonomous vehicle 305 makes the left turn, or other continued operations so as to permit or allow the operations of the second vehicle 310 without change to the operations of the autonomous vehicle 305.

FIG. 3C includes an autonomous vehicle 305 with an intended travel 307 and a second vehicle 310 with an intended travel 312, in which the autonomous vehicle 305 may select an assistive strategy mode 106. The second vehicle 310 may be an autonomous or non-autonomous vehicle traveling at a similar speed as the autonomous vehicle 305. As shown in FIG. 3C, the autonomous vehicle 305 may detect the second vehicle 310 and its strategy mode and/or actions. For example, the autonomous vehicle 305 may detect the intended travel 312 of the second vehicle 310 as it proceeds into the intersection. Because the autonomous vehicle 305 is traveling at a similar speed as the second vehicle 310 and may recognize a conflict between the operations of the second vehicle 310 and its own operations, the autonomous vehicle 305 may select an assistive strategy mode to facilitate the operations by the second vehicle 310.

Referring to FIG. 3C, the set of available actions for the assistive strategy mode of the autonomous vehicle 305 may include accelerating to make a left turn before the second vehicle proceeds into the intersection, decelerating to allow the second vehicle to pass through the intersection before making a left turn, stopping and waiting for the second vehicle to pass through the intersection, flashing lights, emitting audible noises, altering or modifying the intended travel 307 of the autonomous vehicle 305 to avoid a conflict with the second vehicle 310, and/or combinations thereof so as to facilitate the operations of the second vehicle 310 by changing the operations of the autonomous vehicle 305.

FIG. 3D includes an autonomous vehicle 305 with an intended travel 307, and a second vehicle 310 with an intended travel 312, in which the autonomous vehicle 305 may select a preventative strategy mode 108. The second vehicle 310 may be an autonomous or non-autonomous vehicle. As shown in FIG. 3D, the autonomous vehicle 305 may detect the second vehicle 310 and its strategy mode and/or actions. For example, the autonomous vehicle 305 may detect the intended travel 312 of the second vehicle 310 as it seeks to proceed straight through the intersection and past the autonomous vehicle 305 toward the direction from which the autonomous vehicle 305 arrived at the intersection. However, the autonomous vehicle 305 may have additional information related to the intended travel 312 of the second vehicle 310, such as the presence of an accident, construction, traffic congestion, or other incident that should be avoided. Because the autonomous vehicle 305 may recognize a conflict between the operations of the second vehicle 310 and the additional information related to the direction of intended travel 312, the autonomous vehicle 305 may select a preventative strategy mode to prevent the operations by the second vehicle 310.

Referring to FIG. 3D, the set of available actions for the preventative strategy mode of the autonomous vehicle 305 may include performing a U-turn to block the intended travel 312 of the second vehicle 310, changing lanes to block the intended travel 312 of the second vehicle 310, reversing to block the intended travel 312 of the second vehicle 310, flashing lights, emitting audible noises, and/or combinations thereof so as to prevent the operations of the second vehicle 310 by changing the operations of the autonomous vehicle 305. Further, in some embodiments, an autonomous vehicle 305 operating in a preventative strategy mode may not have direct physical access to the second vehicle 310, e.g., the autonomous vehicle 305 is on a roadway from which there is no direct access to the roadway on which the second vehicle 310 is traveling, even if the two roadways are close to or pass each other. However, even in such scenarios, if the autonomous vehicle 305 has additional information related to the intended travel 312 of the second vehicle 310, such as an incident that should be avoided, the autonomous vehicle 305 may select from a set of available actions for the preventative strategy mode to alert the second vehicle 310, e.g., flashing lights or emitting audible noises.

FIG. 4A is a schematic diagram of the four strategy modes 102, 104, 106, 108 for autonomous vehicle operations in a third example environment 400, according to an implementation. The third example environment 400 includes a parking lot in which autonomous and non-autonomous vehicles may perform various actions such as entering the parking lot, leaving the parking lot, starting, stopping, changing directions, making turns, reversing, entering a parking space, leaving a parking space, or other actions. The third example environment 400 includes various parking spaces 401-1, 401-2, 401-3, 401-4, 401-5, 401-6, 401-7, 401-8, 401-9, 401-10, 401-11, 401-12, some of which are occupied by parked vehicles 403-1, 403-2, 403-3, 403-5, 403-6, 403-7, 403-8, 403-10, 403-11.

FIG. 4A includes an autonomous vehicle 405 entering the parking lot and a second vehicle 410 operating within the parking lot, in which the autonomous vehicle 405 may select any of the four strategy modes 102, 104, 106, 108 depending on the detected strategy mode and/or actions of the second vehicle 410 and/or other vehicles in the parking lot. The second vehicle 410 may be an autonomous or non-autonomous vehicle.

As shown in FIG. 4A, the autonomous vehicle 405 may not be able to detect the strategy mode and/or actions of the second vehicle 410. For example, the second vehicle 410 may be stopped within the parking lot and may not be broadcasting or transmitting its strategy mode or any other information. As a result, the autonomous vehicle 405 may select an uncoupled strategy mode and any corresponding action that does not affect or is not affected by the second vehicle 410. Various example actions that the autonomous vehicle 405 may take are shown as travel arrows 402-1, 402-2, 402-3. For example, the autonomous vehicle 405 may reverse out of the parking lot along arrow 402-1. In addition, the autonomous vehicle 405 may make a U-turn and leave the parking lot along arrow 402-2. Further, the autonomous vehicle 405 may proceed to parking space 401-12 along arrow 402-3. Other available uncoupled actions may include stopping and waiting for the second vehicle 410 to move and/or broadcast its strategy mode and/or actions, flashing lights, emitting audible noises, and/ or combinations of any of the above in accordance with the selection of the uncoupled strategy mode for the operations of the autonomous vehicle 405.

Referring to FIG. 4A again, the autonomous vehicle 405 may detect the second vehicle 410 and its strategy mode and/or actions. For example, the autonomous vehicle 405 may detect the intended travel 412 of the second vehicle 410. The intended travel 412 may include any of various actions such as proceeding straight 412-1 past the autonomous vehicle 405, turning right 412-2 into parking space 401-9, or turning left 412-3 into parking space 401-4. As a result of any of the various intended travels 412 of the second vehicle 410, the autonomous vehicle 405 may select a permissive strategy mode and continue its current actions so as to permit the operations by the second vehicle 410. One example action that the autonomous vehicle 405 may take is shown as travel arrow 404. For example, the autonomous vehicle 405 may continue straight along travel arrow 404 at a relatively slow speed that would allow the second vehicle 410 to perform any of the various intended travels 412-1, 412-2, 412-3 without conflict or interference from the autonomous vehicle 405. Other available permissive actions may include continuing to stop and wait until the second vehicle 410 completes any of the various intended travels 412, continuing to make a left turn into parking space 401-12 while the second vehicle 410 proceeds to a parking space along intended travels 412-2 or 412-3 or before the second vehicle 410 reaches the autonomous vehicle 405 along intended travel 412-1, or other continued operations so as to permit or allow the operations of the second vehicle 410 without change to the operations of the autonomous vehicle 405.

Referring to FIG. 4A yet again, the autonomous vehicle 405 may detect the second vehicle 410 and its strategy mode and/or actions. For example, the autonomous vehicle 405 may detect the intended travel 412-3 of the second vehicle 410 as it proceeds to turn left into parking space 401-4. Because the autonomous vehicle 405 is traveling at a similar speed as the second vehicle 410 and may recognize a conflict between the operations of the second vehicle 410 and its own operations, the autonomous vehicle 405 may select an assistive strategy mode to facilitate the operations by the second vehicle 410. Two example actions that the autonomous vehicle 405 may take are shown as travel arrows 406-1, 406-2. For example, the autonomous vehicle 405 may continue straight at a reduced speed along travel arrow 406-1 that would facilitate the intended travel 412-3 of the second vehicle 410 before the autonomous vehicle 405 reached the parking space 401-4. In addition, the autonomous vehicle 405 may continue straight at an increased speed along travel arrow 406-2 that would facilitate the intended travel 412-3 of the second vehicle 410 after the autonomous vehicle 405 passed the parking space 401-4. Other available assistive actions may include stopping and waiting for the second vehicle to enter the parking space 401-4, flashing lights, emitting audible noises, otherwise altering or modifying the intended travel of the autonomous vehicle 405 to avoid a conflict with the second vehicle 410, and/or combinations thereof so as to facilitate the operations of the second vehicle 410 by changing the operations of the autonomous vehicle 405.

Referring to FIG. 4A once again, the autonomous vehicle 405 may detect the second vehicle 410 and its strategy mode and/or actions. For example, the autonomous vehicle 405 may detect the intended travel 412-1 of the second vehicle 410 as it seeks to proceed straight through the parking lot. However, the autonomous vehicle 405 may have additional information related to other vehicles or aspects of the environment, e.g., a reversing movement of vehicle 403-11 out of parking space 401-11, a movement of a pedestrian from a vicinity of vehicle 403-11, or any other incident that should be avoided. Because the autonomous vehicle 405 may recognize a conflict between the operations of the second vehicle 410 and the additional information related to the direction of intended travel 412-1, the autonomous vehicle 405 may select a preventative strategy mode to prevent the operations by the second vehicle 410. One example action that the autonomous vehicle may take is shown as travel arrow 408-1. For example, the autonomous vehicle 405 may block the movement of the second vehicle 410 along intended travel 412-1 so as prevent an incident, e.g., a collision with vehicle 403-11 reversing out of parking space 401-11, or a contact with a pedestrian moving out from a vicinity of vehicle 403-11.

As another example, the autonomous vehicle 405 may detect the intended travel 412-3 of the second vehicle 410 as it proceeds to turn left into parking space 401-4. However, the autonomous vehicle 405 may have additional information related to other vehicles or aspects of the environment, e.g., a reversing movement of vehicle 403-3 out of parking space 401-3, a movement of a pedestrian from a vicinity of vehicle 403-3, or any other incident that should be avoided. Because the autonomous vehicle 405 may recognize a conflict between the operations of the second vehicle 410 and the additional information related to the direction of intended travel 412-3, the autonomous vehicle 405 may select a preventative strategy mode to prevent the operations by the second vehicle 410. One example action that the autonomous vehicle may take is shown as travel arrow 408-2. For example, the autonomous vehicle 405 may block the movement of the second vehicle 410 along intended travel 412-3 so as prevent an incident, e.g., a collision with vehicle 403-3 reversing out of parking space 401-3, or a contact with a pedestrian moving out from a vicinity of vehicle 403-3.

Other available preventative actions may include blocking a movement of the second vehicle 410, blocking a movement of any other vehicle 403, blocking a movement of a pedestrian, flashing lights, emitting audible noises, and/or combinations thereof so as to prevent the operations of the second vehicle 410 by changing the operations of the autonomous vehicle 405.

Figure 4C:
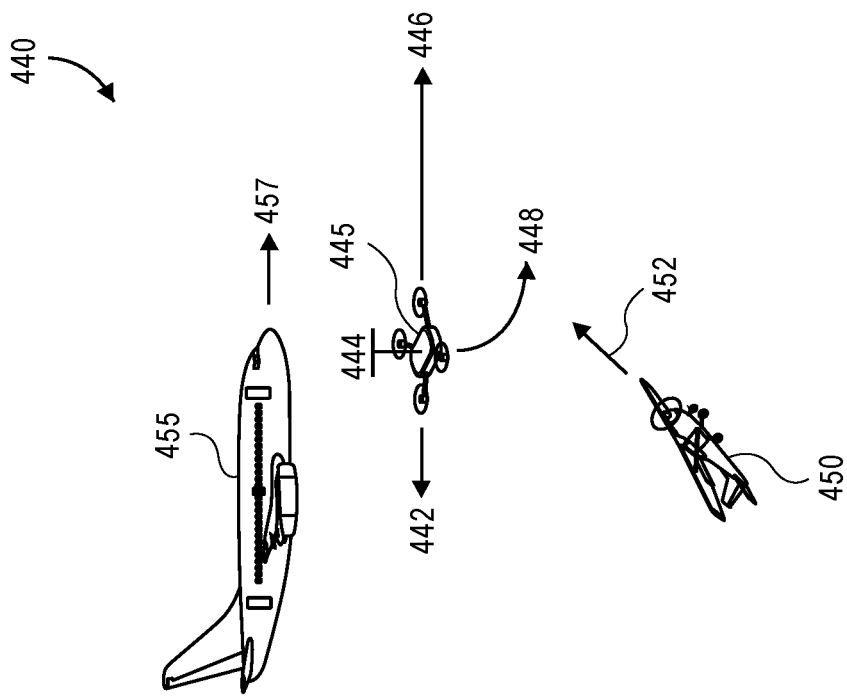
FIG. 4C is a schematic diagram of strategy modes for autonomous vehicle operations in a fifth example environment, according to an implementation.
Figure 4B:
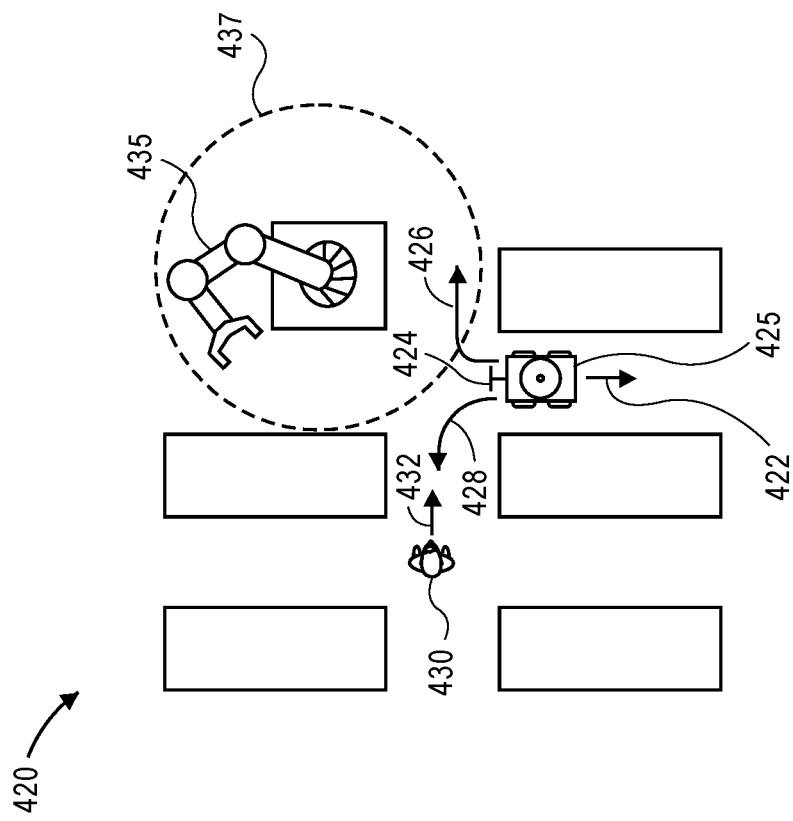
FIG. 4B is a schematic diagram of strategy modes for autonomous vehicle operations in a fourth example environment, according to an implementation.

FIG. 4B is a schematic diagram of the four strategy modes 102, 104, 106, 108 for autonomous vehicle operations in a fourth example environment 420, according to an implementation. The fourth example environment 420 includes a warehouse, distribution facility, manufacturing facility, or other facility in which autonomous and non-autonomous vehicles and systems may perform various actions such as receiving items, sorting items, storing items, retrieving items, packing items, transferring items, manufacturing items, assembling items, or other actions. The fourth example environment 420 includes various storage areas, processing stations or areas, aisles, or other areas.

FIG. 4B includes an autonomous vehicle 425 traversing an aisle within the facility, a human worker or operator 430 traversing another aisle within the facility, and a robotic or mechatronic arm or system 435 situated within the facility. The autonomous vehicle 425 may select any of the four strategy modes 102, 104, 106, 108 depending on the detected strategy mode and/or actions of the human worker or operator 430, the robotic or mechatronic arm or system 435, and/or other operators, systems, or vehicles in the facility. The robotic or mechatronic arm or system 435 may be an autonomous or non-autonomous system, and the robotic or mechatronic arm or system 435 may have an associated radius 437, which may be hazardous to enter by other operators, vehicles, or systems during operation.

As shown in FIG. 4B, the autonomous vehicle 425 may not be able to detect the actions of the human worker or operator 430. For example, the human worker or operator 430 may have stopped within an aisle of the facility. As a result, the autonomous vehicle 425 may select an uncoupled strategy mode and any corresponding action that does not affect or is not affected by the human worker or operator 430. One example action that the autonomous vehicle 425 may take is shown as travel arrow 422. For example, the autonomous vehicle 425 may reverse its direction and travel along an aisle away from the human worker or operator 430. Other available uncoupled actions may include making a U-turn and leaving the area, stopping and waiting for the human worker or operator 430 to move, flashing lights, emitting audible noises, and/or combinations of any of the above in accordance with the selection of the uncoupled strategy mode for the operations of the autonomous vehicle 425.

Referring to FIG. 4B again, the autonomous vehicle 425 may detect the human worker or operator 430 and its actions. For example, the autonomous vehicle 425 may detect the intended travel 432 of the human worker or operator 430 proceeding straight along the aisle toward the robotic or mechatronic arm or system 435, which may not currently be in operation. As a result of the intended travel 432 of the human worker or operator 430, the autonomous vehicle 425 may select a permissive strategy mode and continue its current actions so as to permit the operations by the human worker or operator 430. One example action that the autonomous vehicle 425 may take is shown as travel arrow 424. For example, the autonomous vehicle 425 may continue waiting at the end of the aisle until the human worker or operator 430 passes by. Other available permissive actions may include continuing to move slowly along the aisle such that the human worker or operator 430 passes by, continuing to move away from the area, or other continued operations so as to permit or allow the operations of the human worker or operator 430 without change to the operations of the autonomous vehicle 425.

Referring to FIG. 4B yet again, the autonomous vehicle 425 may detect the human worker or operator 430 and its actions. For example, the autonomous vehicle 425 may detect the intended travel 432 of the human worker or operator 430 proceeding straight along the aisle toward the robotic or mechatronic arm or system 435, which may not currently be in operation. Because the autonomous vehicle 425 is traveling at a similar speed as the human worker or operator 430 and may recognize a conflict between the operations of the human worker or operator 430 and its own operations, the autonomous vehicle 425 may select an assistive strategy mode to facilitate the operations by the human worker or operator 430. One example action that the autonomous vehicle 425 may take is shown as travel arrow 426. For example, the autonomous vehicle 425 may turn right and proceed along travel arrow 426 away from the human worker or operator 430 in order to facilitate the intended travel 432 of the human worker or operator 430. Other available assistive actions may include stopping and waiting for the human worker or operator 430 to pass by, flashing lights, emitting audible noises, otherwise altering or modifying the intended travel of the autonomous vehicle 425 to avoid a conflict with the human worker or operator 430, and/or combinations thereof so as to facilitate the operations of the human worker or operator 430 by changing the operations of the autonomous vehicle 425.

Referring to FIG. 4B once again, the autonomous vehicle 425 may detect the human worker or operator 430 and its actions. For example, the autonomous vehicle 425 may detect the intended travel 432 of the human worker or operator 430 proceeding straight along the aisle toward the robotic or mechatronic arm or system 435. However, the autonomous vehicle 425 may have additional information related to other operators, systems, vehicles or aspects of the environment, e.g., a start of operation of the robotic or mechatronic arm or system 435, or any other incident that should be avoided. Because the autonomous vehicle 425 may recognize a conflict between the operations of the human worker or operator 430 and the additional information related to the direction of intended travel 432, e.g., a start of operation of the robotic or mechatronic arm or system 435, the autonomous vehicle 425 may select a preventative strategy mode to prevent the operations by the human worker or operator 430. One example action that the autonomous vehicle may take is shown as travel arrow 428. For example, the autonomous vehicle 425 may block the movement of the human worker or operator 430 along intended travel 432 so as prevent an incident, e.g., a contact or collision with the robotic or mechatronic arm or system 435 within its radius 437 of operation.

Other available preventative actions may include redirecting or guiding a movement of the human worker or operator 430 away from the hazardous area, blocking a movement of the robotic or mechatronic arm or system 435, flashing lights, emitting audible noises, and/or combinations thereof so as to prevent the operations of the human worker or operator 430 by changing the operations of the autonomous vehicle 425.

FIG. 4C is a schematic diagram of the four strategy modes 102, 104, 106, 108 for autonomous vehicle operations in a fifth example environment 440, according to an implementation. The fifth example environment 440 includes an airspace in which autonomous and non-autonomous vehicles and systems may perform various actions such as transporting items or people, changing directions, changing speeds, changing altitudes, or other actions.

FIG. 4C includes an autonomous vehicle 445 operating within the airspace, a small passenger plane 450 traveling along intended travel 452, and a large commercial airliner 455 traveling along intended travel 457. The autonomous vehicle 445 may select any of the four strategy modes 102, 104, 106, 108 depending on the detected strategy mode and/or actions of the small passenger plane 450, the large commercial airliner 455, and/or other operators, systems, or vehicles in the airspace. The small passenger plane 450 and/or the large commercial airliner 455 may be autonomous or non-autonomous systems.

As shown in FIG. 4C, the autonomous vehicle 445 may not be able to detect the strategy mode and/or actions of the small passenger plane 450. For example, the small passenger plane 450 may be performing a maneuver that is not recognized by the autonomous vehicle 445. As a result, the autonomous vehicle 445 may select an uncoupled strategy mode and any corresponding action that does not affect or is not affected by the small passenger plane 450. One example action that the autonomous vehicle 445 may take is shown as travel arrow 442. For example, the autonomous vehicle 445 may change its direction and travel away from the small passenger plane 450. Other available uncoupled actions may include changing altitudes, speeds, and/or directions and traveling away from the small passenger plane 450, stopping, hovering, and waiting for the small passenger plane 450 to move and/or provide its strategy mode and/or actions, flashing lights, emitting audible noises, and/or combinations of any of the above in accordance with the selection of the uncoupled strategy mode for the operations of the autonomous vehicle 445.

Referring to FIG. 4C again, the autonomous vehicle 445 may detect the small passenger plane 450 and its strategy mode and/or actions. For example, the autonomous vehicle 445 may detect the intended travel 452 of the small passenger plane 450. As a result of the intended travel 452 of the small passenger plane 450, the autonomous vehicle 445 may select a permissive strategy mode and continue its current actions so as to permit the operations by the small passenger plane 450. One example action that the autonomous vehicle 445 may take is shown as travel arrow 444. For example, the autonomous vehicle 445 may continue hovering and waiting until the small passenger plane 450 passes by. Other available permissive actions may include continuing to move slowly in a direction such that the small passenger plane 450 passes by, continuing to move away from the area, or other continued operations so as to permit or allow the operations of the small passenger plane 450 without change to the operations of the autonomous vehicle 445.

Referring to FIG. 4C yet again, the autonomous vehicle 445 may detect the small passenger plane 450 and its strategy mode and/or actions. For example, the autonomous vehicle 445 may detect the intended travel 452 of the small passenger plane 450. If the autonomous vehicle 445 is traveling at a similar speed in a similar direction as the small passenger plane 450 and may recognize a conflict between the operations of the small passenger plane 450 and its own operations, the autonomous vehicle 445 may select an assistive strategy mode to facilitate the operations by the small passenger plane 450. One example action that the autonomous vehicle 445 may take is shown as travel arrow 446. For example, the autonomous vehicle 445 may increase speed and proceed along travel arrow 446 that would facilitate the intended travel 452 of the small passenger plane 450 behind the autonomous vehicle 445. Other available assistive actions may include changing altitudes, speeds, and/or directions such that the autonomous vehicle 445 does not interfere with the intended travel 452 of the small passenger plane 450, stopping, hovering, and waiting for the small passenger plane 450 to pass by, flashing lights, emitting audible noises, otherwise altering or modifying the intended travel of the autonomous vehicle 445 to avoid a conflict with the small passenger plane 450, and/or combinations thereof so as to facilitate the operations of the small passenger plane 450 by changing the operations of the autonomous vehicle 445.

Referring to FIG. 4C once again, the autonomous vehicle 445 may detect the small passenger plane 450 and its strategy mode and/or actions. For example, the autonomous vehicle 445 may detect the intended travel 452 of the small passenger plane 450. However, the autonomous vehicle 445 may have additional information related to other operators, systems, vehicles, or aspects of the environment, e.g., a large commercial airliner 455 with intended travel 457 that potentially conflicts with the intended travel 452 of the small passenger plane 450, or any other incident that should be avoided. Because the autonomous vehicle 445 may recognize a conflict between the operations of the small passenger plane 450 and the additional information related to the direction of intended travel 452, the autonomous vehicle 445 may select a preventative strategy mode to prevent the operations by the small passenger plane 450. One example action that the autonomous vehicle may take is shown as travel arrow 448. For example, the autonomous vehicle 445 may block the movement of the small passenger plane 450 along intended travel 452 so as prevent an incident, e.g., a proximity, contact, or collision with the large commercial airliner 455.

Other available preventative actions may include redirecting or guiding a movement of the small passenger plane 450 away from any potential conflict, redirecting or guiding a movement of the large commercial airliner 455, flashing lights, and/or combinations thereof so as to prevent the operations of the small passenger plane 450 by changing the operations of the autonomous vehicle 445.

In any of the various example environments shown in FIGS. 2A-2D, 3A-3D, and 4A-4C, or in any other environments, an autonomous vehicle may detect strategy modes of one or more other vehicles. Based at least in part on the detected strategy modes of one or more other vehicles, the autonomous vehicle may select a strategy mode for its own operation.

For example, in some embodiments, if an autonomous vehicle cannot detect a strategy mode of a second vehicle, the autonomous vehicle may select an uncoupled strategy mode. Then, the autonomous vehicle may select an uncoupled action that does not affect or is not affected by operations of the second vehicle. Example uncoupled actions may include stopping and waiting, reversing, making a U-turn, or otherwise traveling away from the second vehicle having the unknown strategy mode. Alternatively, if the autonomous vehicle cannot detect a strategy mode of a second vehicle, the autonomous vehicle may select a preventative strategy mode if the autonomous vehicle has additional information that may not be available to the second vehicle. Then, the autonomous vehicle may select a preventative action to prevent one or more possible actions of the second vehicle, e.g., proceeding toward an accident, construction zone, or other incident of which the autonomous vehicle has additional information. Example preventative actions may include changing lanes, changing speeds, making a U-turn, or otherwise preventing one or more possible actions of the second vehicle. Additional example preventative actions may include guiding the second vehicle, e.g., an aerial vehicle, toward an airspace, holding zone, flight path, runway, circuit, or landing pad. Further, if the autonomous vehicle cannot detect a strategy mode of a second vehicle but the second vehicle begins to take an action, the autonomous vehicle may select any of the uncoupled, permissive, assistive, or preventative strategy modes. Then, the autonomous vehicle may select an action corresponding to the selected strategy mode, e.g., an uncoupled action that does not affect or is not affected by the action of the second vehicle, a permissive action that permits the action by the second vehicle, an assistive action that facilitates the action by the second vehicle, or a preventative action that prevents the action by the second vehicle.

In other embodiments, if an autonomous vehicle detects that a second vehicle is operating in an uncoupled strategy mode, the autonomous vehicle may select any of the uncoupled, permissive, assistive, or preventative strategy modes. Then, because the second vehicle is expected to take an uncoupled action, i.e., an action that does not affect or is not affected by operations of the autonomous vehicle, the autonomous vehicle may select an action corresponding to the selected strategy mode, e.g., an uncoupled action that similarly does not affect or is not affected by the uncoupled action of the second vehicle, a permissive action that permits the uncoupled action by the second vehicle, an assistive action that facilitates the uncoupled action by the second vehicle, or a preventative action that prevents the uncoupled action by the second vehicle, e.g., if the autonomous vehicle has additional information that may not be available to the second vehicle. Any of the example actions described herein may be selected based on the selected strategy mode.

In further embodiments, if an autonomous vehicle detects that a second vehicle is operating in a permissive strategy mode, the autonomous vehicle may select any of the uncoupled, permissive, assistive, or preventative strategy modes. Then, because the second vehicle is expected to take a permissive action, i.e., an action that permits the operations of the autonomous vehicle without change to the operations of the second vehicle, the autonomous vehicle may select an action corresponding to the selected strategy mode, e.g., an uncoupled action that does not affect or is not affected by the permissive action of the second vehicle, a permissive action that similarly permits the permissive action by the second vehicle, an assistive action that facilitates the permissive action by the second vehicle, or a preventative action that prevents the permissive action by the second vehicle, e.g., if the autonomous vehicle has additional information that may not be available to the second vehicle. Any of the example actions described herein may be selected based on the selected strategy mode. In one particular example, if both the autonomous vehicle and the second vehicle are operating in permissive strategy modes, each vehicle may continue its operations without change, e.g., stopping or hovering in place and waiting for the other vehicle to move. Then, based at least in part on a cost function of continuing to stop and wait, one or both vehicles may select new strategy modes in order to resolve the current scenario. The cost function may be related to one or more operational goals of one or both of the vehicles, as further described herein.

In still further embodiments, if an autonomous vehicle detects that a second vehicle is operating in an assistive strategy mode, the autonomous vehicle may select any of the uncoupled, permissive, assistive, or preventative strategy modes. Then, because the second vehicle is expected to take an assistive action, i.e., an action that facilitates the operations of the autonomous vehicle by changing the operations of the second vehicle, the autonomous vehicle may select an action corresponding to the selected strategy mode, e.g., an uncoupled action that does not affect or is not affected by the assistive action of the second vehicle, a permissive action that permits the assistive action by the second vehicle, an assistive action that similarly facilitates the assistive action by the second vehicle, or a preventative action that prevents the assistive action by the second vehicle, e.g., if the autonomous vehicle has additional information that may not be available to the second vehicle. Any of the example actions described herein may be selected based on the selected strategy mode. In one particular example, if both the autonomous vehicle and the second vehicle are operating in assistive strategy modes, each vehicle may change its operations to facilitate operations of the other vehicle, e.g., slowing and/or stopping or hovering in place and waiting for the other vehicle to complete its operation. Then, based at least in part on a cost function of continuing to slow and/or stop and wait, one or both vehicles may select new strategy modes in order to resolve the current scenario. The cost function may be related to one or more operational goals of one or both of the vehicles, as further described herein.

In other embodiments, if an autonomous vehicle detects that a second vehicle is operating in a preventative strategy mode, e.g., if the second vehicle has additional information that may not be available to the autonomous vehicle, the autonomous vehicle may select any of the uncoupled, permissive, assistive, or preventative strategy modes. Then, because the second vehicle is expected to take a preventative action, i.e., an action that prevents one or more operations of the autonomous vehicle by changing the operations of the second vehicle, the autonomous vehicle may select an action corresponding to the selected strategy mode, e.g., an uncoupled action that does not affect or is not affected by the preventative action of the second vehicle, a permissive action that permits the preventative action by the second vehicle, an assistive action that facilitates the preventative action by the second vehicle, or a preventative action that similarly prevents the preventative action by the second vehicle, e.g., if the autonomous vehicle has additional information that may not be available to the second vehicle. Any of the example actions described herein may be selected based on the selected strategy mode. In one particular example, if both the autonomous vehicle and the second vehicle are operating in preventative strategy modes, each vehicle may change its operations to prevent operations of the other vehicle, e.g., blocking an intended travel or operation of each other, or attempting operations to guide the other vehicle toward an airspace, holding zone, flight path, runway, circuit, or landing pad. Then, based at least in part on a cost function of continuing to block or attempt to guide each other, one or both vehicles may select new strategy modes in order to resolve the current scenario. The cost function may be related to one or more operational goals of one or both of the vehicles, as further described herein.

In any of the embodiments described herein, if an autonomous vehicle is unable to select a strategy mode based on detected information about other vehicles and/or its environment, and/or if the autonomous vehicle is unable to select an action based on a selected strategy mode, remote assistance may be utilized to provide direct guidance or recommendations to the autonomous vehicle, e.g., by one or more remote, human operators connected to the autonomous vehicle over a network or via the autonomous vehicle management system, as described herein. For example, the various information about other vehicles and/or its environment detected by the autonomous vehicle may be provided to the remote, human operator, e.g., via a computing device using associated output devices, and the remote, human operator may provide guidance or recommendations to the autonomous vehicle such as a suggested strategy mode and/or a suggested action, e.g., via the computing device using associated input devices.

Although FIGS. 2A-2D, 3A-3D, and 4A-4C describe particular example strategy modes and/or actions of various autonomous or non-autonomous vehicles, any other number or combination of autonomous or non-autonomous vehicles, strategy modes, and/or actions may interact in various example environments. For example, more than two vehicles may interact along a roadway, at an intersection, in a parking lot, or in any other environments. In addition, the vehicles that are interacting in any of the various example environments or in any other environments may be operating with any combination of strategy modes. Further, various other actions in addition to changing lanes, changing speeds, changing directions, making turns, starting, stopping, reversing, entering parking spaces, exiting parking spaces, or any other actions may be performed by various vehicles in any of the various example environments or in any other environments. For example, other actions related to aerial vehicles may include taking off, landing, entering airspaces/zones, exiting airspaces/zones, modifying flight paths, changing altitude, changing speed, changing direction, hovering or loitering in place, avoiding static or dynamic obstacles, or any other actions associated with aerial vehicles.

Accordingly, as shown in FIGS. 2A-2D, 3A-3D, and 4A-4C, an autonomous vehicle may detect strategy modes and/or actions of other vehicles, and may select a strategy mode based on such information. Then, the autonomous vehicle may select an action from a set of available actions corresponding to the selected strategy mode. The set of available actions for the selected strategy mode may include various actions or combinations of actions, including but not limited to those described herein, and the set of available actions may vary based on the selected strategy mode, as well as the particular scenarios and/or environments within which the autonomous vehicle is operating.

The autonomous vehicle may also select a strategy mode and/or an action based on characteristics and/or capabilities of the autonomous vehicle and/or other vehicles, as further described herein. In addition, the autonomous vehicle may also select a strategy mode and/or an action based on aspects of the environment and/or topological constraints associated with the environment, as further described herein. Further, the autonomous vehicle may also select a strategy mode and/or an action based on one or more operational goals of the autonomous vehicle, as further described herein. The operational goals may include one or more of safety, resolvability, efficiency, time, priority, throughput, on-time completion, average speed, number of incidents or conflicts, fuel or resource utilization, and/or other goals.

Figure 5:
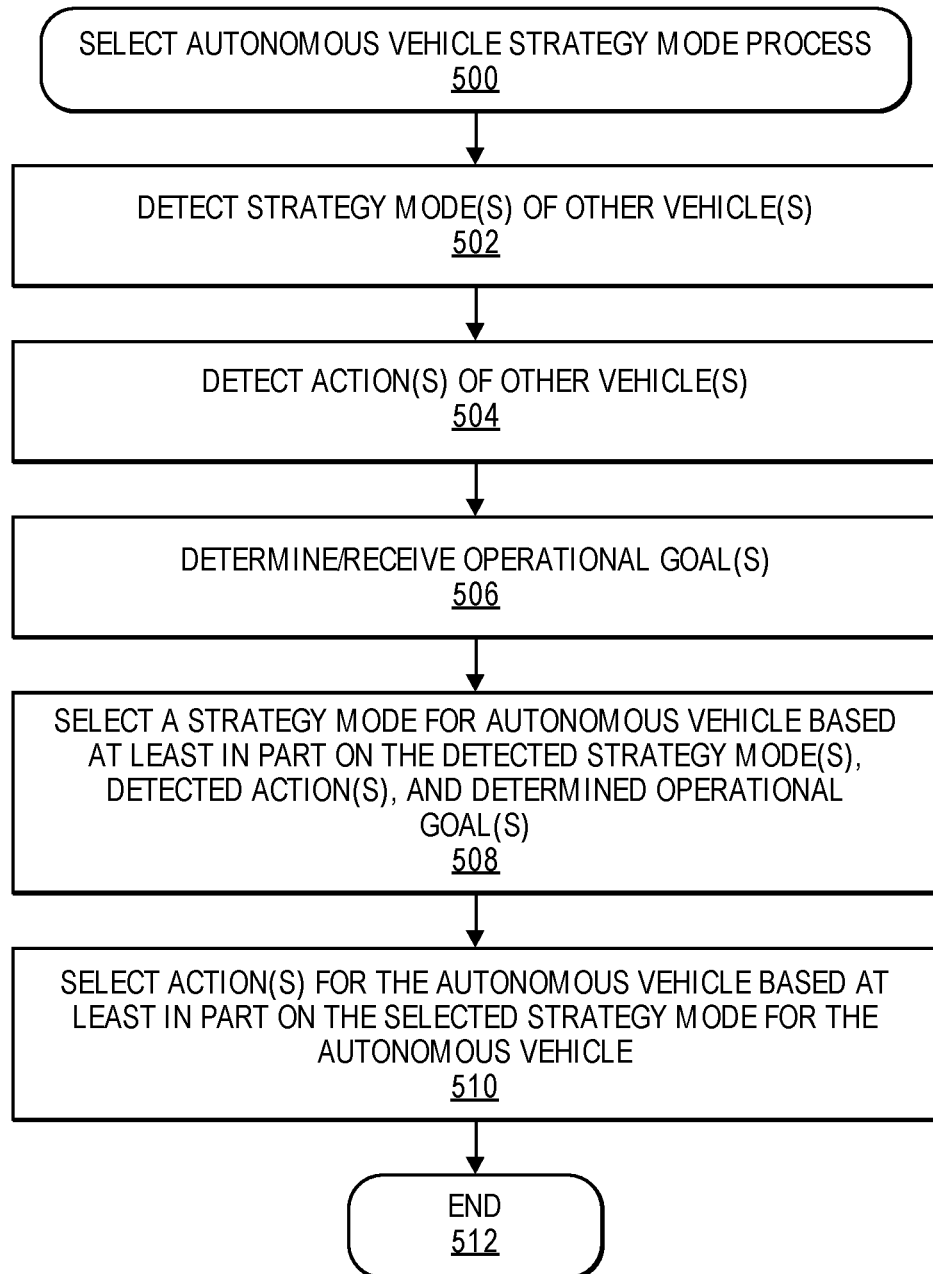
FIG. 5 is a flow diagram illustrating an example strategy mode selection process for autonomous vehicle operations, according to an implementation.

FIG. 5 is a flow diagram illustrating an example strategy mode selection process 500 for autonomous vehicle operations, according to an implementation. The process 500 may begin by detecting one or more strategy modes of one or more other vehicles, as at 502. For example, an autonomous vehicle may be located in a local environment together with the other vehicles. The strategy modes of the other vehicles may be detected using any of the various methods and structures for detecting strategy modes, as further described herein. The process may continue by detecting one or more actions of the one or more other vehicles, as at 504. For example, the actions of the other vehicles may be detected using any of the various methods and structures for detecting actions, as further described herein. The process may then proceed to determining or receiving one or more operational goals for the autonomous vehicle, as at 506. As described herein, the operational goals may include one or more of safety, resolvability, efficiency, time, priority, throughput, on-time completion, average speed, number of incidents or conflicts, fuel or resource utilization, and/or other goals.

Based at least in part on the detected strategy modes of other vehicles, the detected actions of other vehicles, and/or the operational goals of the autonomous vehicle, a strategy mode may be selected for the autonomous vehicle, as at 508. As described herein, the strategy mode may be one of an uncoupled strategy mode, a permissive strategy mode, an assistive strategy mode, or a preventative strategy mode. Then, based at least in part on the selected strategy mode, one or more actions may be selected for the autonomous vehicle, as at 510. As described herein, the set of available actions may include various actions or combinations of actions based at least in part on the selected strategy mode. The process 500 may then end at 512.

The process 500 may repeat continuously or intermittently. For example, the autonomous vehicle may monitor for changes to the strategy modes or actions of other vehicles, changes to its operational goals, and/or changes to the other vehicles that are located in the local environment with the autonomous vehicle. Based on any changes to the other vehicles or the operational goals, the autonomous vehicle may select a new strategy mode and corresponding actions.

Figure 6:
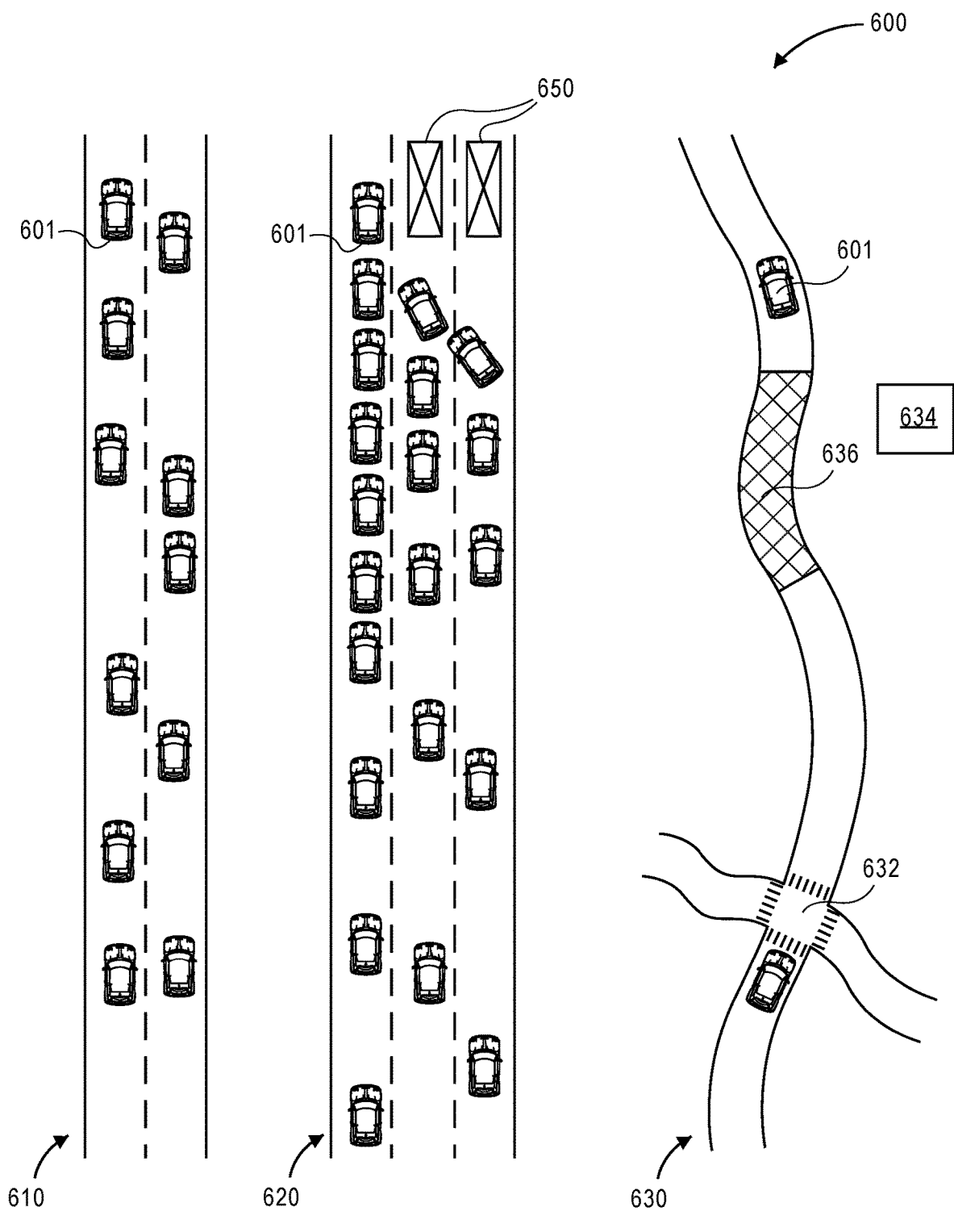
FIG. 6 is a schematic diagram of coordinated optimization of strategy modes for autonomous vehicle operations in a first example environment, according to an implementation.

FIG. 6 is a schematic diagram of coordinated optimization of strategy modes 600 for autonomous vehicle operations in a first example environment, according to an implementation. The first example environment includes three different roadways 610, 620, 630 that generally traverse from a similar starting point to a similar ending point. The first roadway 610 may be a two-lane roadway, e.g., an arterial road or freeway on which vehicles may travel at a medium speed, the second roadway 620 may be a three-lane roadway, e.g., a highway or expressway on which vehicles may travel at a high speed, and the third roadway 630 may be a one-lane roadway, e.g., a local road or street on which vehicles may travel at a slow speed. In addition, the second roadway 620 may include an accident, construction zone, or other incident 650, that is causing traffic congestion on the second roadway 620. Further, the third roadway 630 may also include an intersection 632 having stop signs or traffic lights and a low speed zone 636, e.g., a school zone near a school 634. Various types of autonomous and non-autonomous vehicles 601 may utilize any of the three roadways 610, 620, 630.

An autonomous vehicle management system 640 may be in communication with one or more of the vehicles 601, as well as an autonomous vehicle 605 that is currently located at a starting point associated with the three roadways 610, 620, 630. The autonomous vehicle management system 640 may receive information from the vehicles 601, including strategy modes, actions, operational goals, aspects of the environment, and topological constraints. The autonomous vehicle management system 640 may also receive information from the autonomous vehicle 605, including its strategy mode, actions, operational goals, and potentially other information associated with the autonomous vehicle 605. The aspects of the environment may include elements in the environment such as road signs, traffic signals, pedestrians, cyclists, animals, trees, buildings, obstructions, natural or artificial obstacles, human-operated vehicles, disabled or malfunctioning vehicles, dynamic environmental conditions such as wind/gusts, rain, snow, ice, or pressure, or other elements. The topological constraints may include roadway or pathway characteristics or conditions, weather associated the environment, or characteristics or capabilities of the vehicles. In addition, the topological constraints may be determined based at least in part on the aspects of the environment. The aspects of the environment and the topological constraints may be used to determine or filter the set of available actions associated with a selected strategy mode for an autonomous vehicle. The operational goals may include one or more of safety, resolvability, efficiency, time, priority, throughput, on-time completion, average speed, number of incidents or conflicts, fuel or resource utilization, and/or other goals.

The autonomous vehicle management system 640 may also determine or receive one or more operational goals for the system as a whole. The operational goals for the system may include one or more of safety, resolvability, efficiency, time, priority, throughput, on-time completion, average speed, number of incidents or conflicts, fuel or resource utilization, load distribution across the system, risk distribution across the system, and/or other goals. The autonomous vehicle management system 640 may then process all the information received from the vehicles 601 and the autonomous vehicle 605, while also taking into account the operational goals for the system. The autonomous vehicle management system 640 may then instruct modifications to operations of one or more autonomous vehicles in order to achieve the operational goals for the system.

For example, as shown in FIG. 6, the autonomous vehicle management system 640 may receive information from the vehicles 601 regarding strategy modes, actions, operational goals, aspects of the environment, and topological constraints. In particular, the autonomous vehicle management system 640 may receive information regarding the incident 650 on the second roadway 620. Based at least in part on the operational goals of the system, the autonomous vehicle management system 640 may instruct modifications to operations of the autonomous vehicle 605 that seeks to traverse one of the roadways 610, 620, 630, as well as one or more other autonomous vehicles.

In some embodiments, if the autonomous vehicle 605 includes an operational goal related to time, e.g., to traverse one of the roadways 610, 620, 630 by a certain time, the autonomous vehicle 605 may be instructed to traverse first roadway 610 or third roadway 630 to avoid the incident 650. If, however, the autonomous vehicle 605 has an operational goal indicating a lower priority than other autonomous vehicles, the autonomous vehicle may be instructed to proceed along second roadway 620 despite the presence of incident 650, in order to allow other autonomous vehicles to utilize first and third roadways 610, 630 to meet their operational goals. Alternatively, if an autonomous vehicle 605 is an emergency vehicle that includes an operational goal to assist at the scene of the incident 650, the autonomous vehicle 605 may be instructed to traverse second roadway 620 and other autonomous vehicles on second roadway 620 may be instructed to assist the autonomous vehicle 605, e.g., move to the shoulder or block other vehicles, so that the autonomous vehicle 605 may reach the incident 650.

In other embodiments, if the autonomous vehicle management system 640 includes an operational goal related to average speed or load distribution across the system, the autonomous vehicle 605 may be instructed to traverse first roadway 610 or third roadway 630, and other autonomous vehicles may be instructed to traverse one of roadways 610, 620, 630 to achieve the operational goals of the system. If, however, the autonomous vehicle management system 640 includes an operational goal related to throughput, safety, or number of incidents or conflicts, the autonomous vehicle 605 and other autonomous vehicles may be instructed to traverse first roadway 610 and not traverse third roadway 630, in order to move vehicles more quickly through system along first roadway 610 and avoid potential conflicts or safety issues at intersection 632 or at low speed zone 636, as well as to avoid the incident 650 on the second roadway 620.

The operational goals of the autonomous vehicle management system 640 and the operational goals of each of the autonomous vehicles, such as autonomous vehicle 605, may be considered by the autonomous vehicle management system 640 in order to optimally meet all operational goals of the system, as well as operational goals of each of the autonomous vehicles operating within the system.

Figure 7:
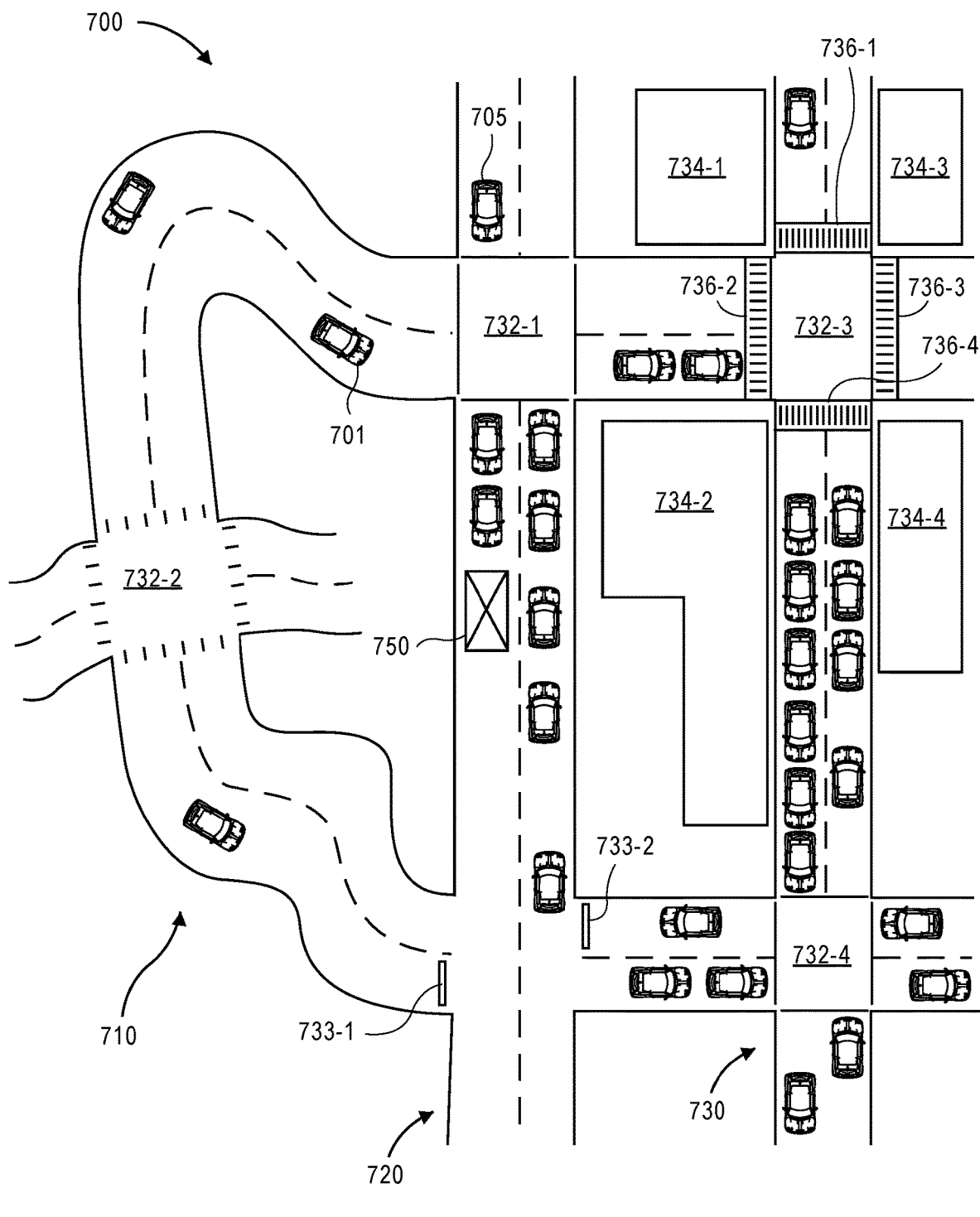
FIG. 7 is a schematic diagram of coordinated optimization of strategy modes for autonomous vehicle operations in a second example environment, according to an implementation.

FIG. 7 is a schematic diagram of coordinated optimization of strategy modes 700 for autonomous vehicle operations in a second example environment, according to an implementation. The second example environment includes three different roadways 710, 720, 730 that are connected to each other by various other roadways and intersections. The first roadway 710 may be a two-way roadway, e.g., a residential road or street on which vehicles may travel at a slow speed, the second roadway 720 may be a two-way roadway, e.g., an arterial road on which vehicles may travel at a medium speed, and the third roadway 730 may be a two-way roadway, e.g., a local road or street near commercial buildings, such as stores or restaurants 734-1, 734-2, 734-3, 734-4, on which vehicles may travel at a medium to slow speed. In addition, the first roadway 710 may include an intersection 732-2 having four-way stop signs. Further, the second roadway 720 may include an intersection 732-1 having a traffic signal and be crossed by a smaller roadway having two-way stop signs 733-1, 733-2. The second roadway 720 may also include a traffic incident 750, e.g., an accident, construction zone, or other incident, that is causing traffic congestion. Moreover, the third roadway 730 may include an intersection 732-3 having a traffic signal and pedestrian walkways 736-1, 736-2, 736-3, 736-4 and another intersection 732-4 having a traffic signal. Various types of autonomous and non-autonomous vehicles 701 may utilize any of the three roadways 710, 720, 730 and their connecting roadways and intersections.

An autonomous vehicle management system 740 may be in communication with one or more of the vehicles 701, as well as an autonomous vehicle 705 that is currently located at intersection 732-1 and seeks to traverse to a vicinity of intersection 732-4. The autonomous vehicle management system 740 may receive information from the vehicles 701, including strategy modes, actions, operational goals, aspects of the environment, and topological constraints. The autonomous vehicle management system 740 may also receive information from the autonomous vehicle 705, including its strategy mode, actions, operational goals, and potentially other information associated with the autonomous vehicle 705. The aspects of the environment may include elements in the environment such as road signs, traffic signals, pedestrians, cyclists, animals, trees, buildings, obstructions, natural or artificial obstacles, human-operated vehicles, disabled or malfunctioning vehicles, dynamic environmental conditions such as wind/gusts, rain, snow, ice, or pressure, or other elements. The topological constraints may include roadway or pathway characteristics or conditions, weather associated the environment, or characteristics or capabilities of the vehicles. In addition, the topological constraints may be determined based at least in part on the aspects of the environment. The aspects of the environment and the topological constraints may be used to determine or filter the set of available actions associated with a selected strategy mode for an autonomous vehicle. The operational goals may include one or more of safety, resolvability, efficiency, time, priority, throughput, on-time completion, average speed, number of incidents or conflicts, fuel or resource utilization, and/or other goals.

The autonomous vehicle management system 740 may also determine or receive one or more operational goals for the system as a whole. The operational goals for the system may include one or more of safety, resolvability, efficiency, time, priority, throughput, on-time completion, average speed, number of incidents or conflicts, fuel or resource utilization, load distribution across the system, risk distribution across the system, and/or other goals. The autonomous vehicle management system 740 may then process all the information received from the vehicles 701 and the autonomous vehicle 705, while also taking into account the operational goals for the system. The autonomous vehicle management system 740 may then instruct modifications to operations of one or more autonomous vehicles in order to achieve the operational goals for the system.

For example, as shown in FIG. 7, the autonomous vehicle management system 740 may receive information from the vehicles 701 regarding strategy modes, actions, operational goals, aspects of the environment, and topological constraints. In particular, the autonomous vehicle management system 740 may receive information regarding the incident 750 on the second roadway 720. Based at least in part on the operational goals of the system, the autonomous vehicle management system 740 may instruct modifications to operations of the autonomous vehicle 705 that seeks to traverse one of the roadways 710, 720, 730 to a vicinity of intersection 732-4, as well as one or more other autonomous vehicles.

In some embodiments, if the autonomous vehicle 705 includes an operational goal related to time, e.g., to reach a vicinity of intersection 732-4 by a certain time, the autonomous vehicle 705 may be instructed to traverse first roadway 710 to avoid the incident 750 on the second roadway 720 and also to avoid the traffic congestion on the third roadway 730 associated with the commercial stores and restaurants, traffic signals, and pedestrians. If, however, the autonomous vehicle 705 has an operational goal indicating a lower priority than other autonomous vehicles, the autonomous vehicle may be instructed to proceed along second roadway 720 despite the presence of incident 750 or along third roadway 730 despite the traffic congestion, in order to allow other autonomous vehicles to utilize first roadway 710 to meet their operational goals. Alternatively, if an autonomous vehicle 705 is an emergency vehicle that has an operational goal to assist at the scene of the incident 750, the autonomous vehicle 705 may be instructed to traverse second roadway 720 and other autonomous vehicles on second roadway 720 may be instructed to assist the autonomous vehicle 705, e.g., move to the shoulder or block other vehicles, so that the autonomous vehicle 705 may reach the incident 750.

In other embodiments, if the autonomous vehicle management system 740 includes an operational goal related to average speed or load distribution across the system, the autonomous vehicle 705 may be instructed to traverse first roadway 710 or third roadway 730, and other autonomous vehicles may be instructed to traverse one of roadways 710, 720, 730 to achieve the operational goals of the system. If, however, the autonomous vehicle management system 740 includes an operational goal related to throughput, safety, or number of incidents or conflicts, the autonomous vehicle 705 and other autonomous vehicles may be instructed to traverse first roadway 710 and not traverse second or third roadways 720, 730, in order to move vehicles more quickly through system along first roadway 710 and avoid potential conflicts or safety issues on second or third roadways 720, 730.

The operational goals of the autonomous vehicle management system 740 and the operational goals of each of the autonomous vehicles, such as autonomous vehicle 705, may be considered by the autonomous vehicle management system 740 in order to optimally meet all operational goals of the system, as well as operational goals of each of the autonomous vehicles operating within the system.

For the example environments shown in FIGS. 6 and 7, as well as other environments in which multiple autonomous vehicles may operate in a coordinated manner, various scheduling, sequencing, and/or management methods and algorithms may be used to coordinate and resolve the various interactions between the vehicles. For example, in some embodiments, vehicles traveling on one or more of the various roadways 610, 620, 630, 710, 720, 730 may coordinate their operations using ad-hoc, peer-to-peer communications, e.g., on the roadway 620 of FIG. 6, the vehicles may utilize peer-to-peer communication algorithms in order to schedule and sequence the vehicles starting from the incident 650 and communicating back to other vehicles that are approaching the incident. In other embodiments, vehicles traveling on one or more of the roadways 610, 620, 630, 710, 720, 730 may provide information to an autonomous vehicle management system and receive scheduling and sequencing instructions from the autonomous vehicle management system. In still other embodiments, combinations of different scheduling, sequencing, and/or management methods and algorithms may be used. For example, an autonomous vehicle management system may provide global- or fleet-level recommendations or suggestions to one or more autonomous vehicles to use particular types of roadways, but then allow the one or more autonomous vehicles to operate in a peer-to-peer mode with other vehicles in order to resolve local interactions with each other. Moreover, although FIGS. 6 and 7 illustrate ground-based vehicles, similar scheduling, sequencing, and/or management methods and algorithms may be used in other environments with other types of autonomous vehicles, e.g., air-based vehicles, water-based vehicles, space-based vehicles, automated guided vehicles, robotic vehicles or systems, or any other environments in which autonomous and non-autonomous vehicles and systems may interoperate.

Each environment in which a vehicle may operate may be associated with a topological number. The topological number may be a value or measure related to the available degrees of freedom of movement of the vehicle within the environment. For example, a maximum topological number of four may be associated with an environment in which a vehicle has freedom of movement along four axes, i.e., x, y, z, and time. An aerial vehicle operating in an airspace that is free of obstacles along all four axes may be operating in an environment associated with a topological number at or close to four. Similarly, a submarine operating in a body of water that is free of obstacles along all four axes may also be operating in an environment associated with a topological number at or close to four. Likewise, a spacecraft operating in space that is free of obstacles along all four axes may also be operating in an environment associated with a topological number at or close to four. However, a ground-based vehicle generally is not capable of movement along the z-axis, e.g., a vertical direction, and thus, a ground-based vehicle operating in an open area that is free of obstacles may be operating in an environment associated with a topological number at or close to three.

Topological constraints associated with an environment may be any aspects or elements of the environment that may reduce the topological number associated with the environment. For example, tall buildings, natural obstacles or obstructions, the ground, other aircraft, pathway characteristics, birds, high winds, weather formations, or other aspects or elements of the environment, as well as characteristics or capabilities of the aerial vehicle, may comprise topological constraints that may reduce a topological number associated with an airspace in which an aerial vehicle is operating. Similarly, natural obstacles or obstructions, the floor of the body of water, the surface of the body of water, other watercraft, pathway characteristics, water creatures, high currents, weather formations, or other aspects or elements of the environment, as well as characteristics or capabilities of the submarine, may comprise topological constraints that may reduce a topological number associated with a body of water in which a submarine is operating. Likewise, space debris, other objects in space, planets, suns, other spacecraft, pathway characteristics, or other aspects or elements of the environment, as well as characteristics or capabilities of the spacecraft, may comprise topological constraints that may reduce a topological number associated with a space in which a spacecraft is operating. Furthermore, roadways, curbs, buildings, natural obstacles or obstructions, trees, other ground-based vehicles, roadway characteristics, cyclists, pedestrians, land animals, weather formations, or other aspects or elements of the environment, as well as characteristics or capabilities of the ground-based vehicle, may comprise topological constraints that may reduce a topological number associated with an area in which a ground-based vehicle is operating.

The topological number of an environment may be further reduced based on the characteristics or capabilities of the vehicle itself. For example, even if an aerial vehicle, a submarine, or a spacecraft is operating in an environment with a topological number at or close to four, if the aerial vehicle, submarine, or spacecraft is not capable or designed for movement in a particular direction, the actual topological number associated with the operations of the vehicle in the environment may be reduced, e.g., from a topological number at or close to four to a topological number at or close to three. Likewise, the characteristics or capabilities of ground-based vehicles may impose further topological constraints on the operation of ground-based vehicles within various environments. Such characteristics or capabilities of ground-based vehicles (and other types of vehicles) may include maximum acceleration, maximum deceleration, maximum speed, maximum torque, stopping distance, weight, turning radius, available fuel or power, and/or other characteristics or capabilities of ground-based vehicles (and other types of vehicles). In contrast, other characteristics or capabilities of ground-based vehicles (or other types of vehicles) may reduce or remove topological constraints associated with operation of ground-based vehicles (or other types of vehicles) within particular environments, e.g., off-road capabilities that may allow ground-based vehicles to travel in areas without defined roadways or to traverse over curbs or small obstacles.

In addition, the topological number of an environment may further be based on any other significant or salient elements within the environment, as well as respective poses, e.g., position and orientation, and changes in poses of such significant elements. Moreover, the topological number may change over time based on respective states of such significant elements. For example, the changes to the significant elements may include presence or absence of such elements, and/or changes to their respective poses, e.g., position and/or orientation, over time. Examples of such significant elements may include pathways or aspects thereof, natural or artificial obstacles, or any other movable or changeable elements within various environments.

Accordingly, aspects of the environment, and topological constraints associated with the environment, which may be determined based at least in part on the detected aspects of the environment, may be utilized in the selection of strategy modes by autonomous vehicles, and may also be utilized in the coordinated optimization of autonomous vehicle operations by autonomous vehicle management systems, as described herein.

Although FIGS. 6 and 7 include coordinated optimization of strategy modes for autonomous vehicle operations in example environments based on current incidents or current information related to strategy modes, actions, operational goals, aspects of the environment, and topological constraints, the autonomous vehicle management systems 640, 740 described herein may also receive, store, process, and analyze historical information related to strategy modes, actions, operational goals, aspects of the environment, and topological constraints, and utilize the historical information to instruct modifications to operations of autonomous vehicles. For example, the historical information may include information about incidents, strategy modes, actions, aspects of the environment, and topological constraints associated with particular times of a day, particular days of a week, particular months, particular holidays, particular seasons, particular events, particular weather patterns, particular construction or roadway activities, etc. that may be leveraged to instruct modifications to operations of autonomous vehicles in order to achieve operational goals of the system.

In addition, current or historical information related to strategy modes, actions, operational goals, aspects of the environment, and topological constraints associated with a particular environment may also be utilized to instruct modifications to operations of autonomous vehicles in other similar environments, even in the absence of such current or historical information received directly from such similar environments. Moreover, current or historical information related to strategy modes, actions, operational goals, aspects of the environment, and topological constraints associated with particular combinations of strategy modes, actions, and/or operational goals may also be utilized to instruct modifications to operations of autonomous vehicles in other similar combinations of strategy modes, actions, and/or operational goals, even in the absence of such current or historical information received directly from such similar combinations.

Figure 8:
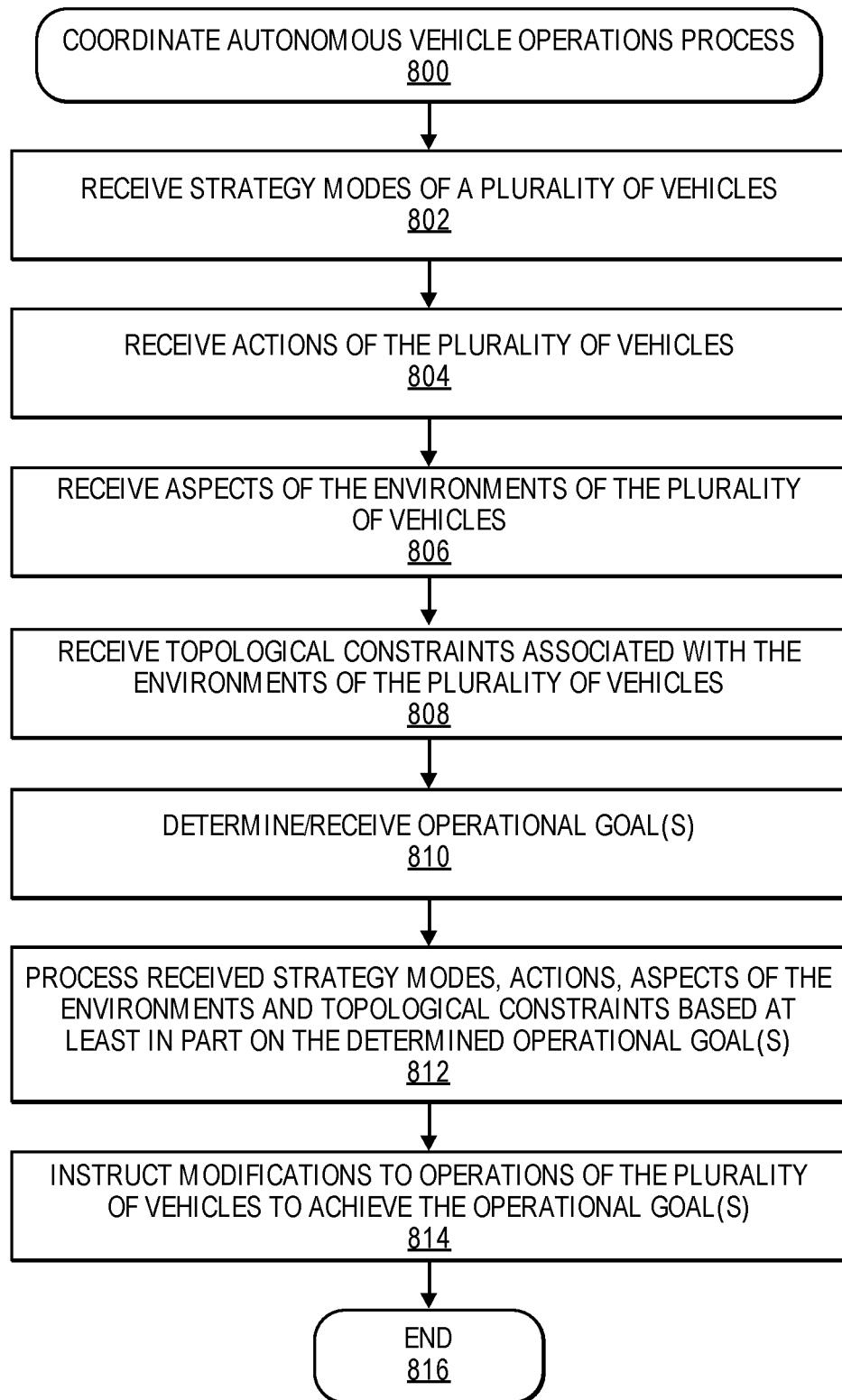
FIG. 8 is a flow diagram illustrating an example coordinated optimization process for autonomous vehicle operations, according to an implementation.

FIG. 8 is a flow diagram illustrating an example coordinated optimization process 800 for autonomous vehicle operations, according to an implementation. The process 800 may begin by receiving strategy modes from a plurality of vehicles, as at 802. For example, various combinations of vehicles may be operating in various environments, and one or more of the various vehicles may provide information related to their strategy modes to an autonomous vehicle management system. The process may continue by receiving actions from the plurality of vehicles, as at 804. For example, various combinations of vehicles may be operating in various environments, and one or more of the various vehicles may provide information related to their actions to an autonomous vehicle management system. The process may then proceed to receiving aspects of the environment detected by the plurality of vehicles, as at 806. For example, various combinations of vehicles may be operating in various environments, and one or more of the various vehicles may provide information related to their environments to an autonomous vehicle management system. The aspects of the environments of the vehicles may be detected using any of the various methods and structures for detecting aspects of the environments, as further described herein. The process may continue by receiving or determining topological constraints associated with the environments of the plurality of vehicles, as at 808. The topological constraints associated with the environments of the vehicles may be determined based at least in part on the detected aspects of the environments, as further described herein. The process may then proceed to determining or receiving one or more operational goals for the system, as at 810. As described herein, the operational goals for the system may include one or more of safety, resolvability, efficiency, time, priority, throughput, on-time completion, average speed, number of incidents or conflicts, fuel or resource utilization, load distribution across the system, risk distribution across the system, and/or other goals.

Based at least in part on the operational goals of the system, the autonomous vehicle management system may process the received or determined information related to strategy modes, actions, aspects of the environment, and topological constraints from the plurality of vehicles, including both current and historical information, as at 812. Then, based at least in part on the processed information, one or more modifications to operations of autonomous vehicles may be instructed to achieve the operational goals of the system, as at 814. The process 800 may then end at 816.

The process 800 may repeat continuously or intermittently. For example, the autonomous vehicle management system may monitor for changes or updated information related to the strategy modes or actions of the plurality of vehicles, changes or updated information related to aspects of the environment or topological constraints, and/or changes to operational goals of the system. Based on any changes to the received or determined information or the operational goals of the system, the autonomous vehicle management system may instruct further modifications to operations of the autonomous vehicles in order to achieve the operational goals of the system.

Figure 9:
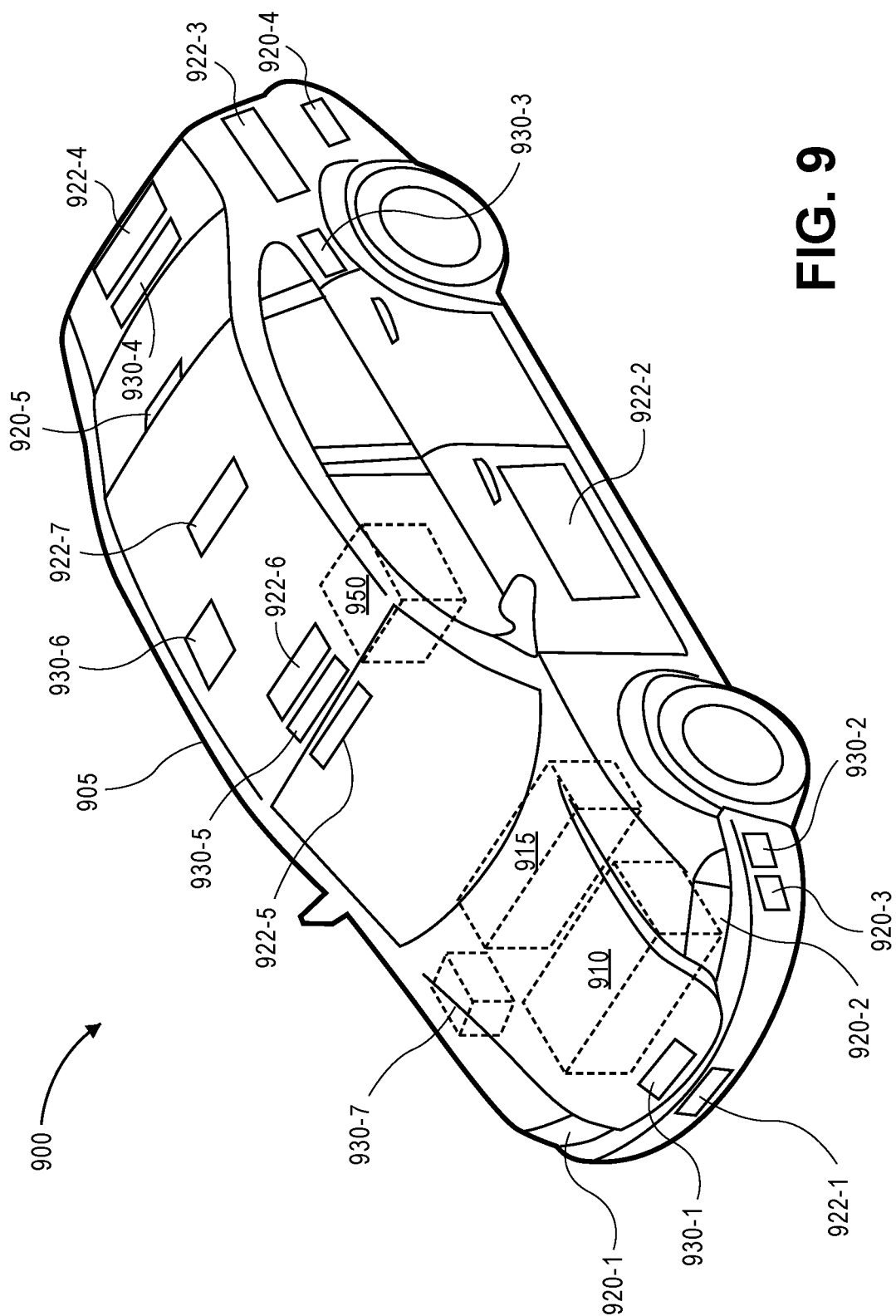
FIG. 9 is a block diagram of an example autonomous vehicle, according to an implementation.

FIG. 9 is a block diagram of an example autonomous vehicle 900, according to an implementation. The autonomous vehicle 900 may include a body 905, a propulsion mechanism 910, a steering mechanism 915, and a control system 950. The body 905 may include a frame, body panels, doors or other closures, and/or other portions that form the structure of the vehicle 900. The propulsion mechanism 910 may include one or more power supplies (not shown) and one or more engines, motors, generators, or other propulsion mechanisms to provide thrust and/or acceleration to the vehicle 900, e.g., via the wheels that are rotated by the propulsion mechanism 910. The steering mechanism 915 may include one or more components that can change a direction of travel of the vehicle 900, e.g., by changing an axis of rotation of one or more wheels. The vehicle 900 may also include other mechanisms or systems not illustrated in FIG. 9, such as a braking or stopping mechanism, a communication system, processors, memories, input/output devices, and/or other mechanisms or systems.

The control system 950 may be in wired or wireless communication with the propulsion mechanism 910, the steering mechanism 915, and any other components of the vehicle 900. The control system 950 may generally control the operation, routing, navigation, and communication of the vehicle 900, as further described herein. Although FIG. 9 shows an example ground-based autonomous vehicle 900, other ground-based vehicles, air-based vehicles, water-based vehicles, space-based vehicles, automated guided vehicles, or other robotic vehicles or systems, or any other types of vehicles may utilize the systems and methods described herein with respect to selection of strategy modes, coordinated optimization of autonomous vehicle operations, broadcast of selected strategy modes, selection of strategy modes based on local surroundings, or any other aspects described herein.

The autonomous vehicle 900 may include various broadcast or notification devices 920, 922 to broadcast a selected strategy mode, or other information. For example, the notification devices may include one or more lights 920, such as headlights 920-1, 920-2, turning signal lights 920-3, 920-4, stop lights 920-5, or other lights. The lights 920 may be used by the autonomous vehicle 900 to broadcast a selected strategy mode, or other information. For example, the lights 920 may be operated in a particular manner, e.g., illuminated for a defined period of time, flashed a defined number of times, operated in sequences or patterns, or operated in other manners, to notify other vehicles of a selected strategy mode or other information for the autonomous vehicle 900. While FIG. 9 shows a particular number and arrangement of lights 920, the autonomous vehicle 900 may include any other number or arrangement of lights 920.

The notification devices 922 may also include various types of devices, such as visual notification devices, audio notification devices, or signal notification devices to broadcast a selected strategy mode, or other information. For example, the autonomous vehicle 900 may include various notification devices 922-1, 922-2, 922-3, 922-4, 922-5, 922-6, 922-7 arranged around the vehicle 900. While FIG. 9 shows a particular number and arrangement of notification devices 922, the autonomous vehicle 900 may include any other number or arrangement of notification devices 922.

Visual notification devices 922 may include visual identifiers, license plates, displays, colors, symbols, or other identifiers on one or more surfaces or locations of the vehicle. The visual notification devices may encode, indicate, or display information related to a selected strategy mode, or other information. In addition, the lights 920 may also form a part of the visual notification devices 922. Further, the autonomous vehicle 900 may perform defined motions that may also serve as visual identifiers. The visual notification devices may or may not be visible to humans, and/or may or may not be discernible or decipherable by humans.

Audio notification devices 922 may include speakers, horns, sirens, or other sound or noise-emitting devices at one or more locations of the vehicle. The audio notification devices may emit sounds or noises that encode, indicate, or broadcast information related to a selected strategy mode, or other information. The sounds or noises emitted by the audio notification devices may or may not be audible to humans, and/or may or may not be discernible or decipherable by humans.

Signal notification devices 922 may include transponders, radiofrequency transmitters, or other electromagnetic signal transmitters at one or more locations of the vehicle. The signal notification devices may emit or transmit signals that encode, indicate, or broadcast information related to a selected strategy mode, or other information. The signals emitted by the signal notification devices may or may not be detectable by humans, and/or may or may not be discernible or decipherable by humans.

By using one or more of the broadcast or notification devices 920, 922, the autonomous vehicle 900 may broadcast, emit, or transmit a selected strategy mode, or other information. The broadcast or emitted information may not require any coordinated communication, e.g., a handshake or negotiation, with other vehicles that may receive the broadcast or emitted information.

In addition to the selected strategy mode, the autonomous vehicle 900 may broadcast, emit, or transmit various other types of information, such as a time of broadcast, a position of the vehicle, a speed or velocity of the vehicle, a priority of the vehicle, a state of the vehicle, capabilities of the vehicle, an identity of the vehicle, a vehicle type of the vehicle, or any other information.

In some embodiments, the selected strategy mode and/or other information may be permanently encoded within an identifier or signal broadcast by a notification device, e.g., a visual identifier such as a barcode, license plate, an alphanumeric identification number, a color, or a symbol, arranged at one or more locations on the vehicle. As a result, the vehicle may always operate in the selected strategy mode, and/or other unchanging information may be permanently encoded in the identifier, such as a priority of the vehicle, capabilities of the vehicle, an identity of the vehicle, or a vehicle type of the vehicle.

In other embodiments, the selected strategy mode and/or other information may be selectively encoded within an identifier or signal broadcast by a notification device, e.g., a visual identifier displayed on a display, an audio identifier emitted by a speaker, or a signal broadcast by a transponder or an electromagnetic or radiofrequency transmitter, arranged at one or more locations on the vehicle. As a result, the vehicle may encode an identifier based on the selected strategy mode, and other information that is to be transmitted, including information that may change during operation of the vehicle, such as a time of broadcast, a position of the vehicle, a speed or velocity of the vehicle, a priority of the vehicle, a state of the vehicle, or capabilities of the vehicle. In addition, if an autonomous vehicle can change its type, e.g., from an air-based vehicle to a ground-based vehicle, the vehicle type of the vehicle may also constitute changeable information that may be encoded in an identifier.

The encoding of the identifiers with information related to a selected strategy mode or other information may follow a defined standard or protocol, and the defined standard or protocol may vary based on locality, region, state, country, local customs, laws, or regulations, and/or other factors. For example, when using the lights 920 as visual notification devices, a particular number of flashes of one or more lights, particular sequences or durations of illumination, particular frequencies or wavelengths of illumination, and/or combinations thereof may be used to encode information related to a selected strategy mode or other information. When using visual notification devices 922 such as identifiers, barcodes, alphanumeric identifiers, license plates, or symbols, particular characters or symbols, or particular sequences of characters or symbols, may be used to encode information related to a selected strategy mode or other information. When using visual notification devices 922 such as colors at one or more locations of the vehicle, the particular values of colors, e.g., values on a red-green-blue (RGB) scale or other color scale, may be used to encode information related to a selected strategy mode or other information. When using visual notification devices 922 such as defined motions of the vehicle, particular types, speeds, accelerations, and/or sequences of motions of the vehicle, or motions of components of the vehicle, may be used to encode information related to a selected strategy mode or other information.

In addition, when using audio notification devices 922, a particular number of emitted sounds, particular sequences or durations of emitted sounds, particular frequencies of emitted sounds, and/or combinations thereof may be used to encode information related to a selected strategy mode or other information. Further, when using signal notification devices 922, particular sequences of data, e.g., digitally encoded data, may be encoded in the emitted signal and may be used to transmit information related to a selected strategy mode or other information.

In other embodiments, notification devices may at least partially randomly encode information within visual identifiers, audio signals, or other emitted signals. For example, one or more portions of such visual identifiers, audio signals, or emitted signals may include a randomly generated number, string, or component, which may be used to resolve potential conflicts between autonomous and/or non-autonomous vehicles. As an example, if two autonomous vehicles are both operating in uncoupled strategy modes and are each waiting for the other vehicle to proceed, randomly generated portions of visual identifiers, audio signals, or emitted signals may be used by the two vehicles to more quickly resolve such a stalemate or conflict by randomly assigning priority to one of the vehicles. Such randomly generated portions of visual identifiers, audio signals, or emitted signals may also be used to more quickly resolve potential conflicts that may occur with other combinations of strategy modes and/or actions.

Figure 10:
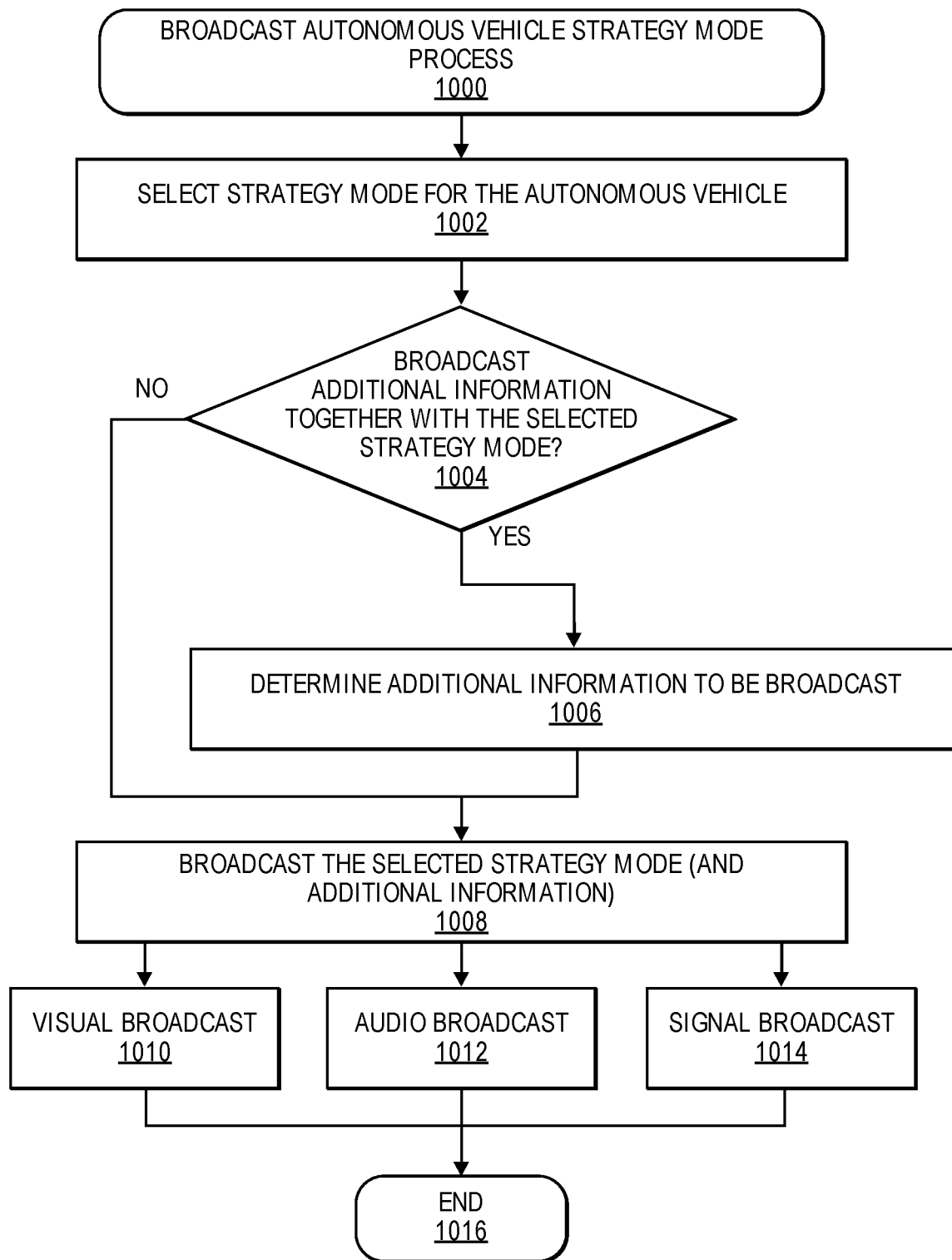
FIG. 10 is a flow diagram illustrating an example strategy mode broadcast process for autonomous vehicle operations, according to an implementation.

FIG. 10 is a flow diagram illustrating an example strategy mode broadcast process 1000 for autonomous vehicle operations, according to an implementation. The process may begin by selecting a strategy mode for the autonomous vehicle, as at 1002, as further described herein. Then, the process may determine whether additional information, in addition to the selected strategy mode, is to be broadcast, as at 1004. For example, the additional information may include a time of broadcast, a position of the vehicle, a speed or velocity of the vehicle, a priority of the vehicle, a state of the vehicle, capabilities of the vehicle, an identity of the vehicle, a vehicle type of the vehicle, or any other information. If additional information is to be broadcast together with the selected strategy mode, then the process proceeds to determine the additional information to be broadcast, as at 1006.

If no additional information is to be broadcast with the selected strategy mode, or after determining the additional information to be broadcast, the process may proceed to encode and broadcast the selected strategy mode, and any additional information, as at 1008. The selected strategy mode, and any additional information, may be broadcast using one or more notification devices as described herein. For example, the visual notification devices may be used, as at 1010, audio notification devices may be used, as at 1012, or signal notification devices may be used, as at 1014. Alternatively or in addition, the selected strategy mode, and any additional information, may be broadcast using multiple types of notification devices, e.g., two or more different types of visual, audio, or signal notification devices, and/or two or more of visual, audio, and signal notification devices. The process then ends, as at 1016.

The process 1000 may repeat continuously or intermittently. For example, the autonomous vehicle may select a new strategy mode based on monitored changes to other vehicles, the environment, or its own operations or capabilities. Then, the autonomous vehicle may determine whether any additional or updated information should be broadcast together with the new, selected strategy mode. The autonomous vehicle may then determine to broadcast the new, selected strategy mode and any additional information using any one or more of the notification devices of the vehicle.

Referring again to FIG. 9, the autonomous vehicle 900 may also include various sensing devices 930 to detect a broadcast strategy mode, or other broadcast information. For example, the sensing devices 930 may include various types of sensing devices, such as visual sensing devices, audio sensing devices, or signal receiving devices to detect a broadcast strategy mode, or other broadcast information. For example, the autonomous vehicle 900 may include various sensing devices 930-1, 930-2, 930-3, 930-4, 930-5, 930-6, 930-7 arranged around the vehicle 900. While FIG. 9 shows a particular number and arrangement of sensing devices 930, the autonomous vehicle 900 may include any other number or arrangement of sensing devices 930.

Visual sensing devices 930 may include imaging devices, imaging sensors, radar, LIDAR, time of flight sensors, thermal or infrared sensors, or other visual sensing devices to detect broadcast visual identifiers, license plates, displays, colors, symbols, or other identifiers on one or more surfaces or locations of a sensed vehicle. The visual sensing devices may detect, decode, and/or decipher information related to a broadcast strategy mode, or other broadcast information. In addition, the visual sensing devices 930 may also detect, decode, and/or decipher the illumination or flashing of one or more lights 920 of a sensed vehicle. Further, the visual sensing devices 930 may also detect, decode, and/or decipher defined motions performed by a sensed vehicle. The visual identifiers detected by the visual sensing devices 930 may or may not be visible to humans, and/or may or may not be discernible or decipherable by humans.

Audio sensing devices 930 may include microphones or other sound or noise-receiving devices at one or more locations of the vehicle. The audio sensing devices may detect, decode, and/or decipher sounds or noises related to a broadcast strategy mode, or other broadcast information. The sounds or noises detected by the audio sensing devices may or may not be audible to humans, and/or may or may not be discernible or decipherable by humans.

Signal receiving devices 930 may include signal receivers, radiofrequency identification readers, or other electromagnetic signal receivers at one or more locations of the vehicle. The signal receiving devices may detect, decode, and/or decipher signals related to a broadcast strategy mode, or other broadcast information. The signals detected by the signal receiving devices may or may not be detectable by humans, and/or may or may not be discernible or decipherable by humans.

In addition to the selected strategy mode, the autonomous vehicle 900 may detect various other types of information, such as a time of broadcast, a position of the sensed vehicle, a speed or velocity of the sensed vehicle, a priority of the sensed vehicle, a state of the sensed vehicle, capabilities of the sensed vehicle, an identity of the sensed vehicle, a vehicle type of the sensed vehicle, or any other information.

Further, the autonomous vehicle 900 may detect actions of other vehicles using any of the sensing devices, and the autonomous vehicle 900 may predict strategy modes of the other vehicles based on the detected actions. For example, if an autonomous vehicle detects a second vehicle taking an uncoupled action, e.g., making a U-turn at an intersection and traveling away from the autonomous vehicle, the autonomous vehicle may predict that the second vehicle is operating in an uncoupled strategy mode. In addition, if an autonomous vehicle detects a second vehicle continuing its current actions without change, e.g., continuing to move at a slow speed through an intersection past the autonomous vehicle, the autonomous vehicle may predict that the second vehicle is operating in a permissive strategy mode. Further, if an autonomous vehicle detects a second vehicle changing its operations in order to facilitate actions of the autonomous vehicle, e.g., slowing down in response to a lane change operation of the autonomous vehicle, the autonomous vehicle may predict that the second vehicle is operating in an assistive strategy mode. Moreover, if an autonomous vehicle detects a second vehicle changing its operations in order to prevent actions of the autonomous vehicle, e.g., blocking a forward travel of the autonomous vehicle, the autonomous vehicle may predict that the second vehicle is operating in a preventative strategy mode.

In addition to the various sensing devices 930 on the vehicle, the autonomous vehicle may also include other types of sensing devices. For example, the autonomous vehicle may include environmental sensors to detect aspects of the environment, e.g., imaging devices, imaging sensors, radar, LIDAR, time of flight sensors, thermal or infrared sensors, microphones or other sound or noise-receiving devices, temperature sensors, humidity sensors, pressure sensors, acceleration sensors, elevation sensors, inclination sensors, and other types of sensors. Further, the autonomous vehicle may include other onboard sensors to detect aspects of the vehicle function or operation, e.g., fuel sensors, battery sensors, temperature sensors, tire pressure sensors, weight sensors, acceleration sensors, turning radius sensors, or other onboard sensors to detect functions or capabilities of the vehicle.

Through the use of such environmental and/or onboard sensors, the autonomous vehicle may detect aspects of the environment, such as road signs, traffic signals, pedestrians, cyclists, animals, trees, buildings, obstructions, natural or artificial obstacles, human-operated vehicles, disabled or malfunctioning vehicles, dynamic environmental conditions such as wind/gusts, rain, snow, ice, or pressure, or other elements in the environment. In addition, through the use of such environmental and/or onboard sensors, the autonomous vehicle may detect or determine topological constraints associated with the environment, such as roadway or pathway characteristics or conditions, weather associated the environment, or characteristics or capabilities of vehicles.

In an alternative embodiment, one or more of the notification devices 920, 922 and/or one or more of the sensing devices 930, along with any associated processor(s), memor (ies), controller(s), and/or input/output devices, may be provided in a separate system that may be installed or used in a vehicle, e.g., an autonomous vehicle, or a non-autonomous, human-operated vehicle. For example, the separate system may include notification devices 920, 922 that may broadcast a strategy mode of the vehicle, which may be permanently encoded and associated with the separate system, or which may be selected by a controller of the separate system based on detected aspects of other vehicles and/or the environment, as described herein, or which may be selected by a human operator via interaction with one or more input devices, e.g., buttons, displays, menus, visual interfaces, audio interfaces, etc., associated with and in communication with the separate system. In addition, the notification devices 920, 922 may also broadcast other information associated with the vehicle. As described herein, the notification devices 920, 922 may be any one or a combination of visual, audio, or signal notification devices.

Further, the separate system may include sensing devices 930 that may detect aspects of other vehicles to determine strategy modes and/or actions of the other vehicles, and/or that may detect aspects of the environment to determine elements of the environment and/or topological constraints associated with the environment. Moreover, the sensing devices 930 of the separate system may also detect aspects of the vehicle characteristics and/or capabilities, as described herein.

For particular embodiments in which the separate system is to be used in a non-autonomous, human-operated vehicle, the separate system may include input/output devices to enable interaction with the separate system by a human operator. For example, the separate system may include input devices, e.g., buttons, displays, menus, visual interfaces, audio interfaces, etc., that may enable a human operator to perform various functions with the separate system, such as power on/power off the separate system, select an operational goal, select a strategy mode, broadcast a strategy mode, select other information to broadcast, select a notification device for broadcast, select an action based on the selected strategy mode, select a sensing device for detection of aspects of other vehicles and/or the environment, or other functions. In addition, the separate system may include output devices, e.g., displays, menus, visual interfaces, audio interfaces, etc., that may enable the separate system to provide information related to strategy modes, actions, elements in the environment, topological constraints, and/or operational goals, suggestions, recommendations, warnings, feedback, or other information to a human operator based on detected aspects of other vehicles and/or the environment. Accordingly, the separate system may be used in non-autonomous, human-operated vehicles, and/or in various different types of autonomous vehicles that may not be able communicate directly with each other, to enable any such vehicles to safely and resolvably interoperate with each other using the strategy modes, actions, and operational goals as described herein.

Moreover, such a separate system with one or more of the notification devices 920, 922 and/or one or more of the sensing devices 930, along with any associated processor(s), memor(ies), controller(s), and/or input/output devices, may also be used by cyclists, pedestrians, or any other entities or humans that desire to broadcast and/or sense strategy modes, actions, aspects of other vehicles, aspects of the environment, and/or other information in order to safely and resolvably interoperate with other autonomous and/or non-autonomous vehicles or systems.

Figure 11:
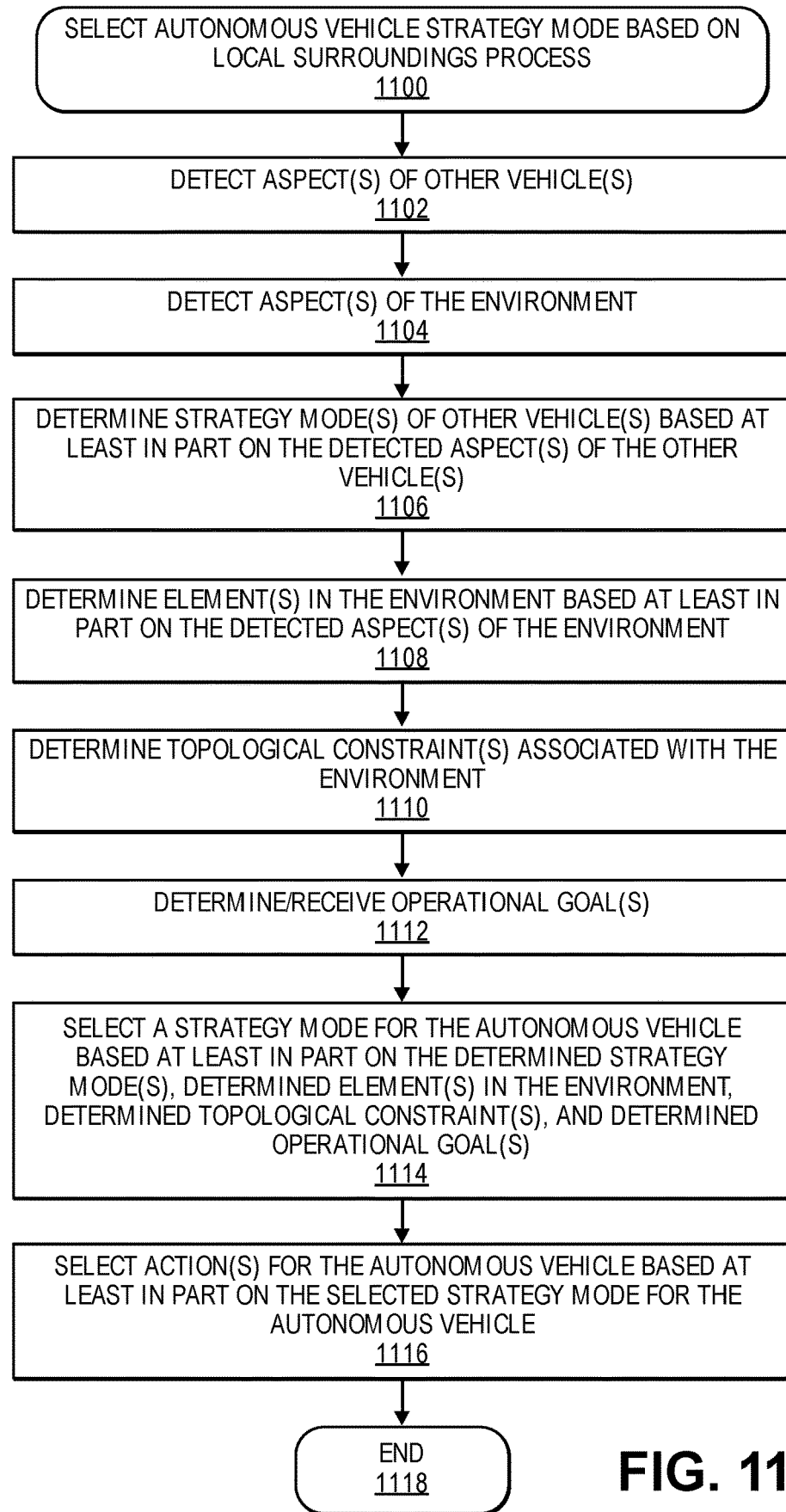
FIG. 11 is a flow diagram illustrating an example strategy mode determination process for autonomous vehicle operations, according to an implementation.

FIG. 11 is a flow diagram illustrating an example strategy mode determination process 1100 for autonomous vehicle operations, according to an implementation. The process may begin by detecting aspects of other vehicles, as at 1102. For example, broadcast information related to strategy modes and/or other information of other vehicles in a local environment near the autonomous vehicle may be detected using one or more sensing devices, as described herein. The process may continue by detecting aspects of the environment, as at 1104. For example, aspects of the local environment near the autonomous vehicle may be detected using one or more sensing devices, as described herein. The process may then proceed to determining strategy modes of other vehicles based at least in part on the detected aspects of the other vehicles, as at 1106. For example, the control system of the autonomous vehicle may process the detected broadcast information, e.g., received visual identifiers, audio identifiers, or signals, to determine strategy modes of the other vehicles.

The process may continue by determining elements in the environment based at least in part on the detected aspects of the environment, as at 1108. For example, the control system of the autonomous vehicle may process the detected aspects of the environment to identify one or more elements in the environment, e.g., road signs, traffic signals, pedestrians, cyclists, animals, trees, buildings, obstructions, natural or artificial obstacles, human-operated vehicles, disabled or malfunctioning vehicles, dynamic environmental conditions such as wind/gusts, rain, snow, ice, or pressure, or other elements in the environment. Then, the process may determine topological constraints associated with the environment, as at 1110. For example, the topological constraints may be determined based at least in part on the detected aspects of the environment and the determined elements in the environment.

The process may then continue to determine or receive operational goals of the autonomous vehicle, as at 1112. For example, the operational goals may include one or more of safety, resolvability, efficiency, time, priority, throughput, on-time completion, average speed, number of incidents or conflicts, fuel or resource utilization, and/or other goals.

Then, the process may proceed to selecting a strategy mode for the autonomous vehicle based at least in part on the determined strategy modes of other vehicles, the determined elements in the environment, the determined topological constraints, and the determined operational goals, as at 1114. For example, the autonomous vehicle may select a strategy mode from among an uncoupled strategy mode, a permissive strategy mode, an assistive strategy mode, and a preventative strategy mode. Then, the process may continue by selecting one or more actions for the autonomous vehicle based at least in part on the selected strategy mode for the autonomous vehicle, as at 1116. For example, the set of available actions for the autonomous vehicle may be determined based at least in part on the selected strategy mode. In addition, the set of available actions may be further determined or filtered based on the determined elements in the environment and/or the topological constraints associated with the environment. The process may then end, as at 1118.

The process 1100 may repeat continuously or intermittently. For example, the autonomous vehicle may monitor for changes to the detected aspects of other vehicles or the environment, changes to the determined strategy modes of other vehicles, changes to the determined elements in the environment and topological constraints associated with the environment, and/or changes to its operational goals. Based on any changes to the other vehicles, the environment, its own operations or capabilities, or the operational goals, the autonomous vehicle may select a new strategy mode and corresponding actions.

Figure 12:
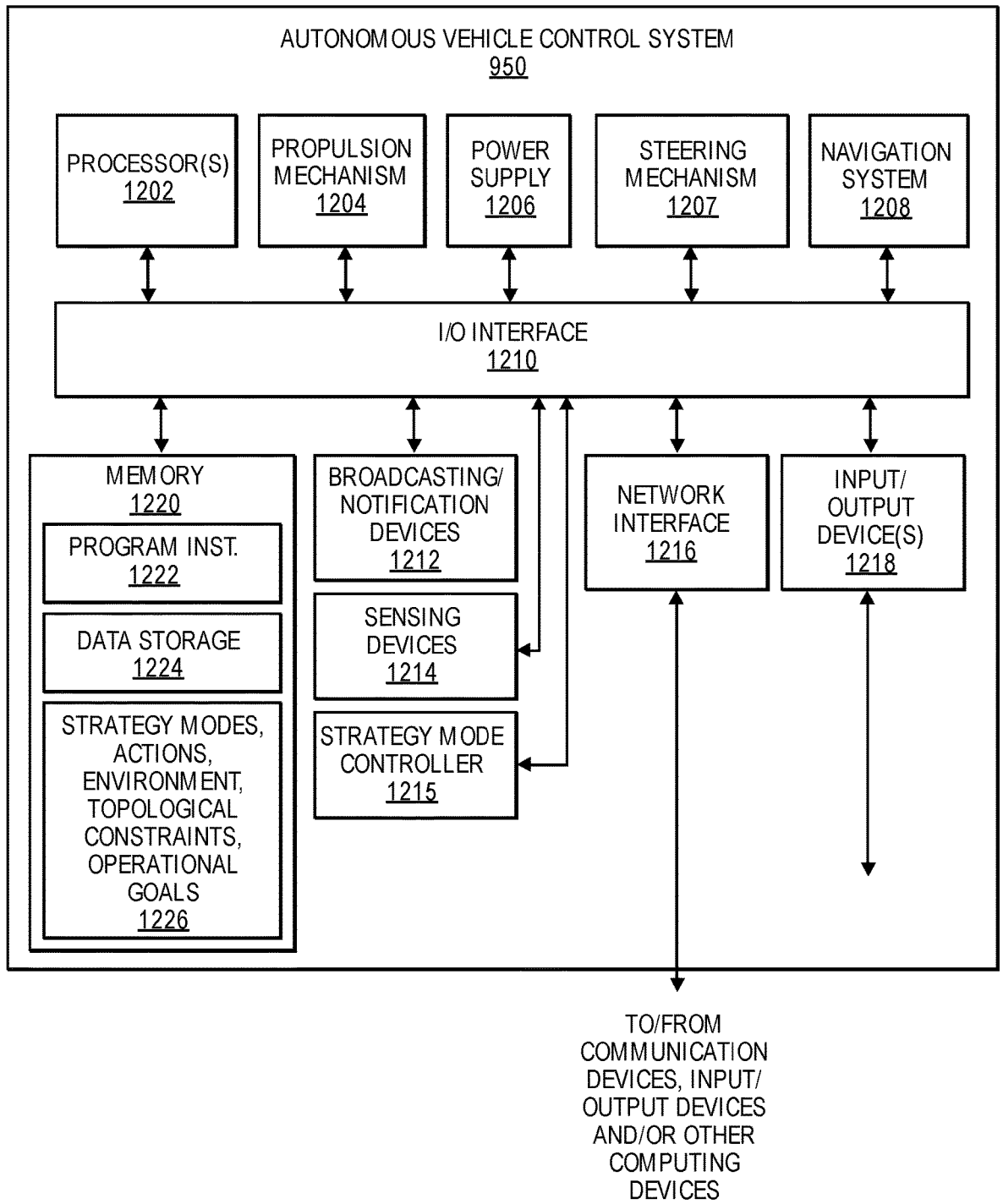
FIG. 12 is a block diagram illustrating various components of an autonomous vehicle control system for selection, broadcast, and determination of strategy modes for autonomous vehicle operations, according to an implementation.

FIG. 12 is a block diagram illustrating various components of an example autonomous vehicle control system 950 for selection, broadcast, and determination of strategy modes for autonomous vehicle operations, according to an implementation. In various examples, the block diagram may be illustrative of one or more aspects of the autonomous vehicle control system 950 that may be used to implement the various systems and processes discussed above. In the illustrated implementation, the autonomous vehicle control system 950 includes one or more processors 1202, coupled to a non-transitory computer readable storage medium 1220 via an input/output (I/O) interface 1210. The autonomous vehicle control system 950 may also include a propulsion mechanism 1204, a power supply 1206, a steering mechanism 1207, and/or a navigation system 1208. The autonomous vehicle control system 950 further includes one or more broadcasting/notification devices 1212, one or more sensing devices 1214, a strategy mode controller 1215, a network interface 1216, and one or more input/output devices 1218.

In various implementations, the autonomous vehicle control system 950 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, data, strategy modes, actions, elements of environments, topological constraints associated with environments, operational goals, and/or data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and strategy modes, actions, environment, topological constraints, and operational goals 1226, respectively. In other implementations, program instructions, data and/or strategy modes, actions, environment, topological constraints, and operational goals may be received, sent or stored upon different types of computer-accessible media, such as non-transitory media, or on similar media separate from the non-transitory computer readable storage medium 1220 or the autonomous vehicle control system 950.

Generally speaking, a non-transitory, computer readable storage medium may include storage media or memory media such as magnetic or optical media, e.g., disk or CD/DVD-ROM, coupled to the autonomous vehicle control system 950 via the I/O interface 1210. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1218. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propulsion mechanism 1204 and the steering mechanism 1207 may communicate with the navigation system 1208 and receive power from the power supply 1206 to control the operation, routing, and navigation of the autonomous vehicle. The navigation system 1208 may include a GPS or other similar system than can be used to navigate the autonomous vehicle to and/or from a location.

The autonomous vehicle control system 950 may also include one or more broadcasting/notification devices 1212 that may be used to broadcast information associated with the vehicle, including strategy modes, actions, aspects of the environments or other information. The autonomous vehicle control system 950 may also include one or more sensing devices 1214 that may be used to detect information broadcast by other vehicles, including strategy modes, actions, aspects of the environments or other information.

The autonomous vehicle control system 950 may also include a strategy mode controller 1215. The strategy mode controller 1215 may communicate with the broadcasting/notification devices 1212, the sensing devices 1214, the processor(s) 1202, the memory 1220, the propulsion mechanism 1204, the steering mechanism 1207, and the navigation system 1208. The strategy mode controller 1215 may receive information detected by the sensing devices 1214, and in combination with data stored in the memory 1220, select strategy modes and/or actions for the autonomous vehicle. The strategy mode controller 1215 may also broadcast information, in combination with data stored in the memory 1220, using the broadcasting/notification devices 1212. The strategy mode controller 1215 may also communicate with the propulsion mechanism 1204, the steering mechanism 1207, and the navigation system 1208 to control the operation, routing, and navigation of the autonomous vehicle based on selected strategy modes and/or actions for the autonomous vehicle.

Figure 13:
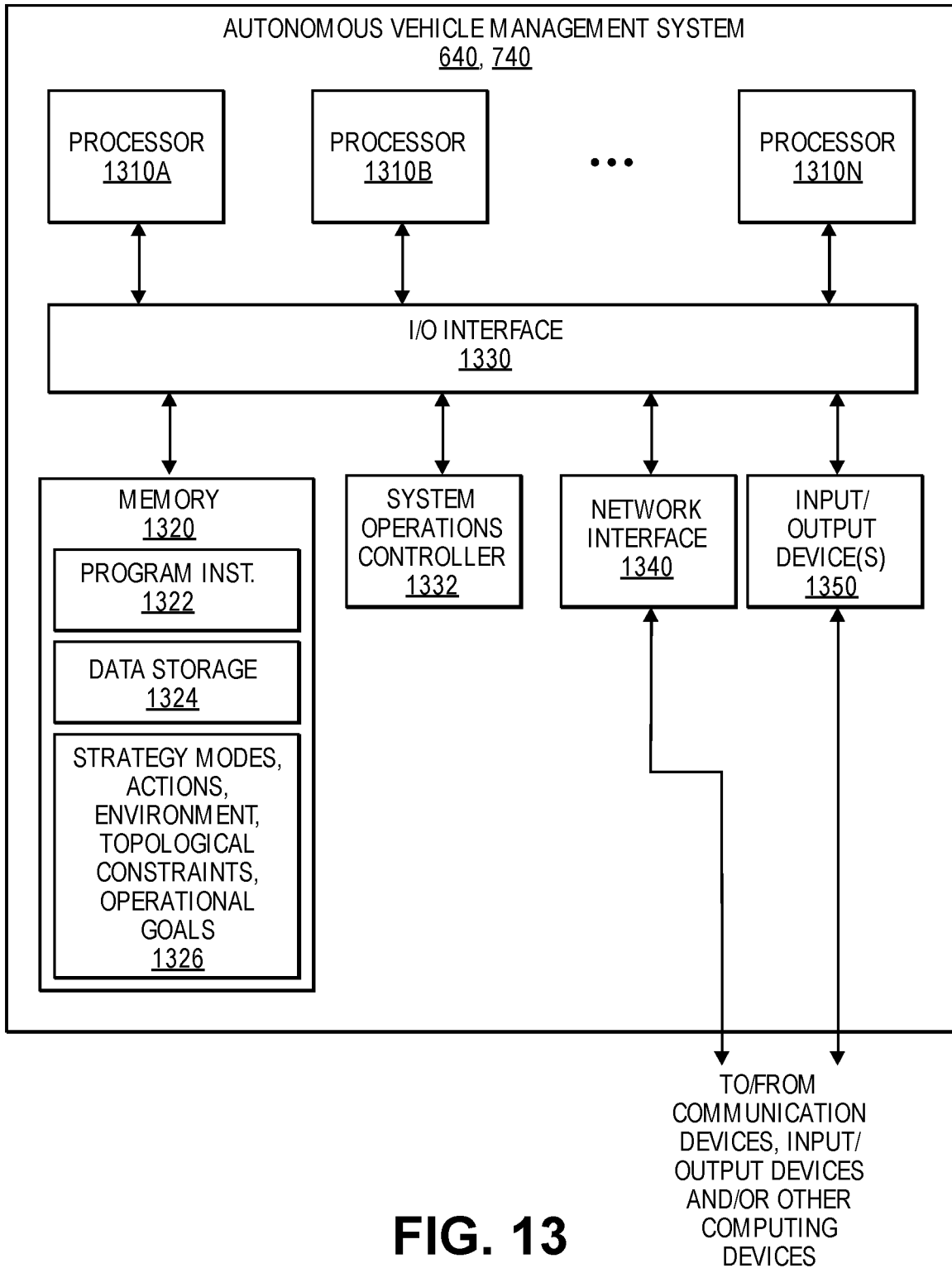
FIG. 13 is a block diagram illustrating various components of an autonomous vehicle management system for coordinated optimization of strategy modes for autonomous vehicle operations, according to an implementation.

The network interface 1216 may be configured to allow data to be exchanged between the autonomous vehicle control system 950, other devices attached to a network, such as other computer systems, the autonomous vehicle management system 640, 740 described with respect to FIG. 13, autonomous vehicle control systems of other autonomous vehicles, and/or separate systems installed or used in other autonomous or non-autonomous vehicles or by other entities or humans, e.g., cyclists, pedestrians. For example, the network interface 1216 may enable wireless communication between numerous autonomous vehicles. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1218 may, in some implementations, include one or more displays, buttons, keyboards, keypads, touchpads, mice, touchscreens, projection devices, visual interfaces, audio output devices, audio interfaces, voice or optical recognition devices, image capture devices, scanning devices, thermal sensors, infrared sensors, time of flight sensors, accelerometers, pressure sensors, weather sensors, other types of sensors described herein, other types of input/output devices described herein, etc. Multiple input/output devices 1218 may be present and controlled by the autonomous vehicle control system 950.

As shown in FIG. 12, the memory may include program instructions 1222 which may be configured to implement the example processes and/or sub-processes described above. The data storage 1224 may include various data stores for maintaining data items that may be provided for determining or selecting strategy modes, actions, aspects or elements of the environments, topological constraints associated with the environments, or operational goals, broadcasting strategy modes and additional information, detecting strategy modes and additional information, etc. The strategy modes may include an uncoupled strategy mode, a permissive strategy mode, an assistive strategy mode, and a preventative strategy mode. The actions may include any sets of available actions associated with various strategy modes, elements in the environment, or topological constraints. The operational goals may include any metrics or goals for which operations of one or more autonomous vehicles may be coordinated and/or optimized.

FIG. 13 is a block diagram illustrating various components of an example autonomous vehicle management system 640, 740 for coordinated optimization of strategy modes for autonomous vehicle operations, according to an implementation.

Various operations of an autonomous vehicle management system, such as those described herein, may be executed on one or more computer systems, interacting with various other devices, according to various implementations. In the illustrated implementation, the autonomous vehicle management system 640, 740 includes one or more processors 1310A, 1310B through 1310N, coupled to a non-transitory computer-readable storage medium 1320 via an input/output (I/O) interface 1330. The autonomous vehicle management system 640, 740 further includes a network interface 1340 coupled to the I/O interface 1330, and one or more input/output devices 1350. In some implementations, it is contemplated that the autonomous vehicle management system may be implemented using a single instance of the autonomous vehicle management system 640, 740, while in other implementations, multiple such systems or multiple nodes making up the autonomous vehicle management system 640, 740 may be configured to host different portions or instances of the autonomous vehicle management system. For example, in one implementation, some data sources or services may be implemented via one or more nodes of the autonomous vehicle management system 640, 740 that are distinct from those nodes implementing other data sources or services. In some implementations, a given node may implement the functionality of more than one component of the autonomous vehicle management system.

In various implementations, the autonomous vehicle management system 640, 740 may be a uniprocessor system including one processor 1310A, or a multiprocessor system including several processors 1310A-1310N (e.g., two, four, eight, or another suitable number). The processors 1310A-1310N may be any suitable processor capable of executing instructions. For example, in various implementations, the processors 1310A-1310N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1310A-1310N may commonly, but not necessarily, implement the same ISA.

The non-transitory computer-readable storage medium 1320 may be configured to store executable instructions and/or data accessible by the one or more processors 1310A-1310N. In various implementations, the non-transitory computer-readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 1320 as program instructions 1322, data storage 1324, and strategy modes, actions, environment, topological constraints, and operational goals 1326, respectively. In other implementations, program instructions and/or data may be received, sent or stored upon different types of computer-accessible media, such as non-transitory media, or on similar media separate from the non-transitory computer-readable storage medium 1320 or the autonomous vehicle management system 640, 740. Generally speaking, a non-transitory, computer-readable storage medium may include storage media or memory media such as magnetic or optical media, e.g., disk or CD/DVD-ROM coupled to the autonomous vehicle management system 640, 740 via the I/O interface 1330. Program instructions and data stored via a non-transitory computer-readable medium may be transmitted by transmission media or signals, such as electrical, electromagnetic, or digital signals, which may be conveyed via a communication medium, such as a network and/or a wireless link, such as may be implemented via the network interface 1340.

In one implementation, the I/O interface 1330 may be configured to coordinate I/O traffic between the processors 1310A-1310N, the non-transitory computer-readable storage medium 1320, and any peripheral devices in the device, including the network interface 1340 or other peripheral interfaces, such as input/output devices 1350. In some implementations, the I/O interface 1330 may perform any necessary protocol, timing or other data transformations to convert data signals from one component (e.g., non-transitory computer-readable storage medium 1320) into a format suitable for use by another component (e.g., processors 1310A-1310N). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer-readable storage medium 1320, may be incorporated directly into the processors 1310A-1310N.

The autonomous vehicle management system 640, 740 may include a system operations controller 1332. The system operations controller 1332 may communicate with a plurality of autonomous vehicles in order to receive and/or store data or information associated with strategy modes, actions, aspects or elements in the environments, topological constraints associated with the environments, and/or operational goals. The system operations controller 1332 may then process the received or stored information based on one or more operational goals of the autonomous vehicle management system 640, 740. The system operations controller 1332 may then communicate with one or more of the plurality of autonomous vehicles to instruct modifications to their operations to achieve the operational goals of the autonomous vehicle management system 640, 740.

The network interface 1340 may be configured to allow data to be exchanged between the autonomous vehicle management system 640, 740 and other devices attached to a network, such as other computer systems, the autonomous vehicle control systems 950 of autonomous vehicles described with respect to FIG. 12, and/or separate systems installed or used in other autonomous or non-autonomous vehicles or by other entities or humans, e.g., cyclists, pedestrians. In various implementations, the network interface 1340 may support communication via wired or wireless general data networks, such as any suitable type of Ethernet network. For example, the network interface 1340 may support communication via telecommunications/telephony networks such as analog voice networks or digital fiber communications networks, via storage area networks such as Fibre Channel SANs, or via any other suitable type of network and/or protocol.

Input/output devices 1350 may, in some implementations, include one or more displays, buttons, keyboards, keypads, touchpads, mice, touchscreens, projection devices, visual interfaces, audio output devices, audio interfaces, voice or optical recognition devices, image capture devices, scanning devices, thermal sensors, infrared sensors, time of flight sensors, accelerometers, pressure sensors, weather sensors, other types of sensors described herein, other types of input/output devices described herein, or any other devices suitable for entering or retrieving data by the autonomous vehicle management system 640, 740. Multiple input/output devices 1350 may be present in the autonomous vehicle management system 640, 740 or may be distributed on various nodes of the autonomous vehicle management system 640, 740. In some implementations, similar input/output devices may be separate from the autonomous vehicle management system 640, 740 and may interact with one or more nodes of the autonomous vehicle management system 640, 740 through a wired or wireless connection, such as over the network interface 1340.

As shown in FIG. 13, the computer-readable storage medium 1320 may include program instructions 1322 which may be configured to implement an autonomous vehicle management system, data storage 1324 which may comprise various tables, databases and/or other data structures accessible by the program instructions 1322, and data related to strategy modes, actions, environment, topological constraints, and operational goals 1326. In one implementation, the program instructions 1322 may include various software modules configured to implement and coordinate operations of the various components of the autonomous vehicle management system 640, 740. The data storage 1324 and other data 1326 may include various data stores for maintaining control and coordination between the various components of the autonomous vehicle management system 640, 740, such as data representing strategy modes or actions of a plurality of vehicles, aspects or elements of various environments, topological constraints associated with various environments, and various operational goals for the autonomous vehicle management system.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the autonomous vehicle control system 950 and the autonomous vehicle management system 640, 740 are merely illustrative and are not intended to limit the scope of the present disclosure. In particular, the computing system and devices may include any combination of hardware or software that can perform the indicated functions, including computers, network devices, internet appliances, PDAs, wireless phones, pagers, etc. The autonomous vehicle control system 950 and/or the autonomous vehicle management system 640, 740 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated autonomous vehicle control system 950 and/or the autonomous vehicle management system 640, 740. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the autonomous vehicle control system 950 and/or the autonomous vehicle management system 640, 740 may be transmitted to the autonomous vehicle control system 950 and/or the autonomous vehicle management system 640, 740 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other autonomous vehicle control system configurations and/or other autonomous vehicle management system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An autonomous ground-based vehicle, comprising:
   a propulsion mechanism;
   a steering mechanism;
   at least one imaging device; and
   a control system comprising a processor and a memory, the control system configured to:
   capture, using the at least one imaging device, at least one image of a second autonomous vehicle and an environment;
   determine a strategy mode of the second autonomous vehicle, at least one aspect related to the environment, and at least one topological constraint associated with the environment based at least in part on the captured at least one image, wherein at least one aspect associated with the second autonomous vehicle within the at least one image indicates the strategy mode selected by the second autonomous vehicle; and
   select an autonomous strategy mode from a plurality of autonomous strategy modes for the autonomous ground-based vehicle based at least in part on the determined strategy mode of the second autonomous vehicle, the determined at least one aspect related to the environment, and the determined at least one topological constraint associated with the environment, wherein the autonomous strategy mode for the autonomous ground-based vehicle comprises one of an uncoupled strategy mode, a permissive strategy mode, an assistive strategy mode, or a preventative strategy mode;
   wherein each of the plurality of autonomous strategy modes comprises a respective set of available actions of the autonomous ground-based vehicle.

2. The autonomous ground-based vehicle of claim 1, wherein the strategy mode of the second autonomous vehicle is determined based at least in part on illumination or flashing of one or more lights of the second autonomous vehicle.

3. The autonomous ground-based vehicle of claim 1, wherein the strategy mode of the second autonomous vehicle is determined based at least in part on a visual identifier on a portion of the second autonomous vehicle.

4. The autonomous ground-based vehicle of claim 1, wherein the strategy mode of the second autonomous vehicle is determined based at least in part on a motion of the second autonomous vehicle.

5. An autonomous vehicle, comprising:
   a propulsion mechanism;
   a steering mechanism;
   at least one sensor; and
   a control system comprising a processor and a memory, the control system configured to:
   detect, using the at least one sensor, at least one aspect of a second autonomous vehicle;
   determine a strategy mode of the second autonomous vehicle based at least in part on the detected at least one aspect, wherein the at least one aspect of the second autonomous vehicle indicates the strategy mode selected by the second autonomous vehicle; and
   select an autonomous strategy mode from a plurality of autonomous strategy modes for the autonomous vehicle based at least in part on the determined strategy mode of the second autonomous vehicle, wherein the autonomous strategy mode for the autonomous vehicle comprises one of an uncoupled strategy mode, a permissive strategy mode, an assistive strategy mode, or a preventative strategy mode;
   wherein each of the plurality of autonomous strategy modes comprises a respective set of available actions of the autonomous vehicle.

6. The autonomous vehicle of claim 5, wherein the at least one sensor comprises an imaging sensor that captures images of at least a portion of the second autonomous vehicle.

7. The autonomous vehicle of claim 6, wherein the at least one aspect comprises at least one of illumination or flashing of one or more lights of the second autonomous vehicle; and
wherein the strategy mode of the second autonomous vehicle is determined based at least in part on the detected at least one of illumination or flashing of the one or more lights.

8. The autonomous vehicle of claim 6, wherein the at least one aspect comprises a visual identifier on the at least a portion of the second autonomous vehicle, the visual identifier comprising at least one of a license plate, an alphanumeric identifier, a symbol, or a color of the at least a portion of the second autonomous vehicle; and
wherein the strategy mode of the second autonomous vehicle is determined based at least in part on the detected visual identifier.

9. The autonomous vehicle of claim 6, wherein the at least one aspect comprises a motion of the second autonomous vehicle; and
wherein the strategy mode of the second autonomous vehicle is determined based at least in part on the detected motion of the second autonomous vehicle.

10. The autonomous vehicle of claim 5, wherein the at least one sensor comprises at least one of a signal receiver or a radiofrequency receiver to receive a signal; and
wherein the at least one aspect comprises a signal broadcast by the second autonomous vehicle that indicates the strategy mode of the second autonomous vehicle.

11. The autonomous vehicle of claim 5, wherein the at least one aspect further indicates at least one of a time of broadcast of a signal, a position of the second autonomous vehicle, a velocity of the second autonomous vehicle, a priority associated with the second autonomous vehicle, a state of the second autonomous vehicle, capabilities of the second autonomous vehicle, an identity of the second autonomous vehicle, or a vehicle type of the second autonomous vehicle.

12. The autonomous vehicle of claim 5, wherein the at least one sensor comprises at least one of a radar sensor or a LIDAR sensor; and
wherein the at least one aspect comprises at least one of a position, a velocity, or a vehicle type of the second autonomous vehicle.

13. The autonomous vehicle of claim 5, wherein the control system is configured to determine the strategy mode of the second autonomous vehicle by predicting the strategy mode of the second autonomous vehicle based at least in part on the detected at least one aspect of the second autonomous vehicle.

14. The autonomous vehicle of claim 5, wherein the control system is further configured to:
detect, using the at least one sensor, at least one aspect related to an environment;
wherein the at least one aspect related to the environment comprises an element in the environment, the element comprising at least one of a natural obstacle, a building, a weather formation, a pathway characteristic, a pedestrian, a cyclist, or an animal;
wherein the autonomous strategy mode for the autonomous vehicle is further selected based at least in part on the detected at least one aspect related to the environment.

15. The autonomous vehicle of claim 5, wherein the control system is further configured to:
determine at least one topological constraint associated with an environment;
wherein the at least one topological constraint comprises at least one of pathway characteristics or conditions, weather conditions associated the environment, or characteristics or capabilities of the autonomous vehicle;
wherein the autonomous strategy mode for the autonomous vehicle is further selected based at least in part on the determined at least one topological constraint associated with the environment.

16. A method of operating an autonomous vehicle, comprising:
detecting, using at least one sensor, at least one aspect of a second autonomous vehicle;
determining a strategy mode of the second autonomous vehicle based at least in part on the detected at least one aspect, wherein the at least one aspect of the second autonomous vehicle indicates the strategy mode selected by the second autonomous vehicle;
selecting an autonomous strategy mode from a plurality of autonomous strategy modes for the autonomous vehicle based at least in part on the determined strategy mode of the second autonomous vehicle, wherein the autonomous strategy mode for the autonomous vehicle comprises one of an uncoupled strategy mode, a permissive strategy mode, an assistive strategy mode, or a preventative strategy mode; and
selecting an action for the autonomous vehicle based at least in part on the selected autonomous strategy mode for the autonomous vehicle, each of the plurality of autonomous strategy modes including a respective set of available actions of the autonomous vehicle.

17. The method of claim 16, further comprising:
detecting, using the at least one sensor, at least one aspect related to an environment;
wherein the autonomous strategy mode for the autonomous vehicle is further selected based at least in part on the detected at least one aspect related to the environment.

18. The method of claim 16, further comprising:
determining at least one topological constraint associated with an environment;
wherein the autonomous strategy mode for the autonomous vehicle is further selected based at least in part on the determined at least one topological constraint associated with the environment.

19. The method of claim 16, wherein determining the strategy mode of the second autonomous vehicle comprises predicting the strategy mode of the second autonomous vehicle based at least in part on the detected at least one aspect of the second autonomous vehicle.

* * * * *